United States Patent [19]

Tsutsui et al.

[11] Patent Number: 5,825,979
[45] Date of Patent: Oct. 20, 1998

[54] DIGITAL AUDIO SIGNAL CODING AND/OR DECIDING METHOD

[75] Inventors: Kyoya Tsutsui; Yoshiaki Oikawa; Osamu Shimoyoshi, all of Kanagawa, Japan

[73] Assignee: Sony Corporation, Tokyo, Japan

[21] Appl. No.: 576,495

[22] Filed: Dec. 21, 1995

[30] Foreign Application Priority Data

Dec. 28, 1994 [JP] Japan ............................... 6-328383

[51] Int. Cl.⁶ ............................ G10L 3/02; G10L 9/00
[52] U.S. Cl. .................. 395/2.91; 395/2.38; 395/2.39; 395/2.33
[58] Field of Search ............................ 395/2.91, 2.38, 395/2.39, 2.33

[56] References Cited

U.S. PATENT DOCUMENTS

| | | | |
|---|---|---|---|
| 3,973,081 | 8/1976 | Hutchins | 380/3 |
| 4,184,049 | 1/1980 | Crochiere et al. | 179/1 SA |
| 4,455,649 | 6/1984 | Esteban et al. | 370/80 |
| 4,535,472 | 8/1985 | Tomcik | 381/31 |
| 4,748,579 | 5/1988 | Zibman et al. | 364/726 |
| 4,827,336 | 5/1989 | Acampora et al. | 358/135 |
| 4,896,362 | 1/1990 | Veldhuis et al. | 381/30 |
| 4,912,763 | 3/1990 | Galand et al. | 381/31 |
| 4,932,062 | 6/1990 | Hamilton | 381/43 |
| 4,972,484 | 11/1990 | Theile et al. | 381/37 |
| 5,049,992 | 9/1991 | Citta et al. | 358/140 |
| 5,109,417 | 4/1992 | Fielder et al. | 381/36 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |

(List continued on next page.)

FOREIGN PATENT DOCUMENTS

| | | | |
|---|---|---|---|
| 0 145 788 A1 | 6/1985 | European Pat. Off. | H04B 12/02 |
| 0 255 111 A2 | 2/1988 | European Pat. Off. | G11B 20/10 |
| 0 289 080 A1 | 11/1988 | European Pat. Off. | H04B 1/66 |
| 0 338 781 A2 | 10/1989 | European Pat. Off. | G11B 20/18 |
| 0 348 132 | 12/1989 | European Pat. Off. | G11B 20/18 |
| 0 409 248 A2 | 1/1991 | European Pat. Off. | H03M 7/36 |

(List continued on next page.)

OTHER PUBLICATIONS

1990 International Conference on Acoustics, Speech and Signal Processing, Albuquerque, New Mexico, 3d–6th Apr. 1990), vol. 2, pp. 1093–1096, IEEE New York, A. Sugiyama et al. Adaptive transform coding with an adaptive block size (ATC–ABS).

Frequenz, vol. 43, No. 9, Sep. 1989, pp. 252–256, Berlin, DE; B. Edler; "Codierung von Audiosignalen mit überlappender Transformation und adaptiven Fensterfunktionen" (Paragraph 4: Stuerung der Fensteradaption.

(List continued on next page.)

*Primary Examiner*—Allen R. MacDonald
*Assistant Examiner*—Robert Louis Sax
*Attorney, Agent, or Firm*—Limbach & Limbach L.L.P.

[57] ABSTRACT

A method and apparatus for high efficiency encoding audio signals. The high-efficiency encoding apparatus includes a transform circuit for transforming an input signal into frequency components and a signal component separating circuit for separating the frequency components into tonal components and noisy components. The high-efficiency encoding apparatus also includes a tonal component encoding circuit for encoding tonal components and a noisy component encoding circuit for encoding noisy components. The tonal components are made up only of signal components of a specified band and encoded along with the information specifying the band. The noisy components are normalized and quantized every pre-set encoding unit and encoded along with the quantization precision information. The information on the numbers of quantization steps of the noisy components is encoded with a smaller number of bits for the high-range side than for the low-range side. With the high-efficiency encoding method and apparatus, not only the main information but also the subsidiary information may be improved in encoding efficiency, while the degree of freedom may be assured in the method of representing the subsidiary information and satisfactory encoding may be achieved.

32 Claims, 15 Drawing Sheets

U.S. PATENT DOCUMENTS

| | | |
|---|---|---|
| 5,157,760 | 10/1992 | Akagiri .................................... 395/2 |
| 5,166,686 | 11/1992 | Sugiymama ............................. 341/155 |
| 5,185,800 | 2/1993 | Mahieux .................................. 381/29 |
| 5,222,189 | 6/1993 | Fielder ..................................... 395/2 |
| 5,243,588 | 9/1993 | Maeda et al. ............................ 369/54 |
| 5,244,705 | 9/1993 | Tsurushima et al. .................... 428/64 |
| 5,285,476 | 2/1994 | Akagiri et al. .......................... 375/25 |
| 5,294,925 | 3/1994 | Akagiri .................................... 341/50 |
| 5,301,205 | 4/1994 | Tsutsui et al. ........................... 375/1 |
| 5,311,561 | 5/1994 | Akagiri .................................... 375/122 |
| 5,367,608 | 11/1994 | Veldhuis et al. ........................ 395/2.38 |
| 5,375,189 | 12/1994 | Tsutsui .................................... 395/2.38 |
| 5,381,143 | 1/1995 | Shimoyoshi et al. ................... 341/51 |
| 5,388,209 | 2/1995 | Akagiri .................................... 395/2.38 |
| 5,416,604 | 5/1995 | Park ......................................... 358/433 |
| 5,438,643 | 8/1995 | Akagiri et al. .......................... 395/2.1 |

FOREIGN PATENT DOCUMENTS

| | | | |
|---|---|---|---|
| 0 424 016 A2 | 4/1991 | European Pat. Off. | .......... H04B 1/66 |
| 0 428 156 A2 | 5/1991 | European Pat. Off. | .......... H03M 7/30 |
| 0 516 342 A3 | 2/1992 | European Pat. Off. | ......... G11B 27/00 |
| 0 506 394 A2 | 9/1992 | European Pat. Off. | .......... G10L 7/00 |
| 0 525 809 A2 | 3/1993 | European Pat. Off. | .......... H04B 1/66 |
| 63-110830 | 5/1988 | Japan | ............................. H04B 14/06 |
| 5-114888 | 5/1993 | Japan | ............................. H04B 14/06 |
| 6-29934 | 2/1994 | Japan | ............................. H04B 14/06 |
| 6-149292 | 5/1994 | Japan | ............................. G10L 9/08 |

OTHER PUBLICATIONS

K. Brandenburg, et al, "ASPEC: Adaptive Spectral Perceptual Entropy Coding of High Quality Music Signals," AES, 90th Convention 1991 Feb. 19–22, Paris, pp. 1–10 and Figs. 1 and 2.

G. Davidson, et al., "Low–Complexity Transform Coder for Satellite Link Applications,"AES, 89th Convention 1990 Sep. 21–25 Los Angeles, pp. 1–22.

J. D. Johnston, "Transform Coding of Audio Signals Using Perceptual Noise Criteria," IEEE Journal on Selected Areas in Communication, vol. 6, No. 2, Feb. 1988, pp. 314–323.

E.F. Schröder, et al., "High Quality Digital Audio Encoding with 3.0 Bits/Sample using Adaptive Transform Coding", AES, 80th Convention 1986 Mar. 4–7 Montreux, Switzerland, pp. 1–7.

D. Esteban, et al., "Application of Quadrature Mirror Filters to Split Band Voice Coding Schemes," 1977 IEEE International Conference on Acoustics, Speech & Signal Processing, pp. 191–195.

G. Stroll, et al., "Masking–Pattern Adapted Subband Coding: Use of the Dynamic Bit–Rate Margin," AES, 8th Conference 199 Mar. 1–4 Paris, pp. 1–33.

G. Theile, et al., "Low bit–rate coding of high–quality audio signals—An introduction to the MASCAM system," EBY Review/Technical, 1988 Aug., No. 230, Brussels, Belgium, pp. 158–181.

Y. Mahieux, et al., "Transform Coding of Audio Signals at 64 Kbit/s," 1990 IEEE, Globecom '90, IEEE Global Telecommunications Conference & Exhibit, pp. 0518–0522.

| NUMBER OF BITS OF QUANTIZATION STEP INFORMATION | | |
|---|---|---|
| | TONAL COMPONENT INFORMATION /121 | NUMBER OF TONAL COMPONENT INFORMATION=2 |
| 3 BITS | QUANTIZATION STEP INFORMATION q1 | BAND SPECIFYING INFORMATION ℓA |
| 3 BITS | QUANTIZATION STEP INFORMATION q2 | QUANTIZATION STEP INFORMATION qA |
| 1 BIT | QUANTIZATION STEP INFORMATION q3 | NORMALIZATION COEFFICIENT INFORMATION nA |
| 1 BIT (122) | QUANTIZATION STEP INFORMATION q4 | NUMBER OF NORMALIZED QUANTIZED FREQUENCY COMPONENT INFORMATION SA1 |
| 1 BIT | QUANTIZATION STEP INFORMATION q5 | |
| 1 BIT | QUANTIZATION STEP INFORMATION q6 | NUMBER OF NORMALIZED QUANTIZED FREQUENCY COMPONENT INFORMATION SA2 |
| 1 BIT | QUANTIZATION STEP INFORMATION q7 | |
| 1 BIT | QUANTIZATION STEP INFORMATION q8 | NUMBER OF NORMALIZED QUANTIZED FREQUENCY COMPONENT INFORMATION SA3 |
| | NORMALIZATION COEFFICIENT INFORMATION n1 | |
| 123 | ⋮ | BAND SPECIFYING INFORMATION ℓB |
| | NORMALIZATION COEFFICIENT INFORMATION n8 | QUANTIZATION STEP INFORMATION qB |
| | | NORMALIZATION COEFFICIENT INFORMATION nB |
| 124 | STRING OF NORMALIZED QUANTIZED FREQUENCY COMPONENTS | NUMBER OF NORMALIZED QUANTIZED FREQUENCY COMPONENT INFORMATION SB1 |
| | | NUMBER OF NORMALIZED QUANTIZED FREQUENCY COMPONENT INFORMATION SB2 |
| | | NUMBER OF NORMALIZED QUANTIZED FREQUENCY COMPONENT INFORMATION SB3 |

FIG.12

DIGITAL AUDIO SIGNAL CODING AND/OR DECIDING METHOD

BACKGROUND OF THE INVENTION

This invention relates to a high-efficiency method and apparatus for high-efficiency encoding of digital signals, such as digital audio signals, a high-efficiency decoding apparatus for decoding the encoded signals, and a recording medium for recording the encoded signals.

There are a variety of known encoding techniques for encoding audio or speech signals with high efficiency. One example is transform coding, in which a frame of digital signals which represent an audio signal on the time axis is converted by an orthogonal transform into a block of spectral coefficients, which represent the audio signal on the frequency axis. Another example is sub-band coding, in which the frequency band of the audio signal is divided by a filter bank into a plurality of sub-bands, without forming the signal into frames along the time axis prior to coding.

It is also known to combine the sub-band coding and transform coding techniques by first dividing digital signals representing the audio signal into a plurality of frequency ranges by sub-band coding, and then transform coding each of the frequency ranges.

One filter for dividing a frequency spectrum into a plurality of equal-width frequency ranges include the quadrature mirror filter (QMF), discussed in R. E. Crochiere, "Digital Coding of Speech in Sub-bands", 55 Bell Syst. Tech J. No. 8 (1976). With a QMF filter, the frequency spectrum of the signal is divided into two equal-width bands. Aliasing does not result when the frequency bands resulting from the division are subsequently combined together.

"Polyphase Quadrature Filters-A New Subband Coding Technique", Joseph H. Rothweiler, ICASSP 83, Boston, also shows a technique of dividing the frequency spectrum of a signal into equal-width frequency bands. With the present polyphase QMF, the frequency spectrum of the signals can be divided at a time into plural equal-width frequency bands.

A known orthogonal transform technique includes dividing the digital input audio signal into frames of a predetermined time duration, and processing the resulting frames using a discrete Fourier transform (DFT), discrete cosine transform (DCT) and modified DCT (MDCT) to convert the signal from the time axis to the frequency axis. Discussions on MDCT may be found in J. P. Princen and A. B. Bradley, "Subband Transform Coding Using Filter Bank Based on Time Domain Aliasing Cancellation", ICASSP 1987.

By quantizing the signals which have been divided into frequency bands, it becomes possible to control those bands which have been subjected to quantization noise. In particular, psychoacoustically more efficient coding may be realized by utilizing psychoacoustic "masking effects." In addition, if the signal components are normalized from band to band with the maximum value of the absolute values of the signal components, it becomes possible to more efficiently code the signal.

One known technique uses sub bands to take advantage of the psychoacoustic characteristics of the human auditory system. Specifically, spectral coefficients representing an audio signal on the frequency axis are divided into a plurality of (e.g. 25) critical frequency bands. The width of the critical bands increase with increasing frequency. Either pre-set bit allocation or adaptive bit allocation is used for encoding the band-base data.

Two known bit allocation techniques are now discussed. The first described in R. Zelinsli and P. Noll, "Adaptive Transform Coding of Speech Signals", IEEE Transactions of Acoustics, Speech, and Signal processing, vol. ASSP-25, No. 4, August 1977, allocates bits to each band on the basis of the amplitude of at least one signal in that band. Application of this results in a flat quantization noise spectrum and minimizes the noisy energy. However, the noisy level perceived by the listener is not optimum because the technique does not effectively exploit the psychoacoustic masking effect.

The second bit allocation technique, described in M. A. Krassner, "The Critical Band Encoder- Digital Encoding of the Perceptual Requirements of the Auditory System", ICASSP 1980, employs a psychoacoustic masking mechanism to determine a fixed bit allocation that produces the necessary signal-to-noisy ratio for each critical band. However, if the signal-to-noisy ratio of the system is measured using a strongly tonal signal (e.g., a 1 kHz sine wave), the results are non-optimum because of the fixed allocation of bits among the critical bands.

To overcome these problems, a high efficiency encoding apparatus has been proposed in which the total number of bits available for bit allocation is divided between a fixed bit allocation pattern, pre-set for each small block, and a block-based signal magnitude dependent bit allocation pattern. The particular allocation division depends upon a signal which is relevant to the input signal, such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing that particular spectral component. This significantly improves the signal-to-noisy characteristics. Since the human auditory system is highly sensitive to a signal having acute spectral components, this technique may be employed for improving the signal-to-noisy ratio of not only measured values but also to improve the quality of the sound as perceived by the listener.

In addition to the above techniques, a variety of other techniques have been proposed, and the model simulating the human auditory system has been refined such that, if the encoding device is improved in its ability, the encoding may be achieved with higher efficiency in light of the human auditory system.

The present Assignee has previously proposed in International Patent Application, International Application No. 94/28633 (to which co-pending U.S. application Ser. No. 08/374518 and European Patent 0653846 correspond), an encoding method which separates acoustically crucial tonal components from spectral signals and encoding these crucial tonal components independently of the remaining spectral components. This enables efficient encoding of audio signals with a high compression ratio, but without substantially acoustically deteriorating the audio signals.

If DFT or DCT is utilized as the method for transforming the waveform signal into a spectral signal, and the transform is executed using a time block made up of M samples, M independent real-number samples are produced. Since a given block is usually overlapped by a total of M1 samples from both neighboring blocks, for reducing connection distortion between the time blocks, M real-number data are quantized and encoded in DFT or DCT for (M–M1) samples.

On the other hand, if the waveform signal is transformed into a spectral signal by MDCT, since M independent real-number data are produced from a 2M sample block which are overlapped by a total of M samples from both neighboring blocks, M real-number data are quantized and encoded in MDCT for M samples. In a decoding device, the coded data from MDCT are inverse-transformed at each block to produce waveform elements which are summed together, to reconstruct the waveform signal.

If the time block length for transform is increased, the frequency resolution is also increased so that the energy is concentrated in a specified spectral component. For this reason, by employing MDCT in which transform is executed with a long block length resulting from half-overlap with both neighboring blocks, and the number of the resulting spectral signals is not increased as compared to the number of the original time samples, the encoding may be achieved with high efficiency than with the use of DFT or DCT. The inter-block distortion of the waveform signal may be reduced by overlapping neighboring blocks with a long overlap length.

For constructing an actual code string, it is sufficient to encode the quantization precision information and the normalization coefficient information with a pre-set number of bits for each respective band intended to be normalized and quantized, and then to encode the normalized and quantized spectral signals.

In International Standard ISO/IEC 11172–3:1993(E), a993 (MPEG-audio standard), pages 16 and 47, there is disclosed a high-efficiency encoding method in which the number of bits representing the quantization step information differs from band to band. That is, fewer bits are used to represent the quantization precision information as frequency increases.

It is also known to determine the quantization precision information in a decoder (from the normalization coefficient information) rather than directly encoding the quantization precision information. However, with this method, since the relation between the normalization precision information and the quantization precision information is predetermined it is not feasible to later control quantization precision based upon a more advanced human auditory sense simulation model. If there is some latitude in the compression ratio to be realized, it becomes necessary to reset the relation between the normalization precision information and the quantization step information when the compression ratio is changed.

To raise the compression ratio further, it is necessary not only to raise the encoding efficiency of the "main information", made up of the normalized and re-quantized frequency components, but also to raise the encoding efficiency of the "subsidiary information", which includes the quantization precision information.

However, since the quantization step required for suppressing signal deterioration in connection with the human auditory sense depends on the frequency component distribution of the input signal, there must be a sufficient degree of freedom to set the quantization step. In addition, there needs to be sufficient degree of freedom to represent the quantization precision information with a variety of compression ratios and the corresponding sound quality.

As for an encoding method, any optional encoding methods may be used insofar as the resulting code satisfies the MPEG-audio standard. However, it is desirable that high efficiency encoding can be achieved with the respective encoding methods.

SUMMARY OF THE INVENTION

The present invention provides a method and apparatus which encodes signals highly efficient so that the encoding efficiency not only of the main information, but also of the subsidiary information, may be increased and so that the subsidiary information may be represented in such a manner as to assure a sufficient degree of freedom to realize optimum encoding.

The present invention further provides a method and apparatus of high efficiency encoding whereby the resulting code meets the MPEG-audio standard and a high encoding efficiency may be achieved.

It is yet another object of the present invention to provide a method and apparatus for decoding the signals encoded with the encoding method and apparatus and a transmission medium for transmission of encoded strings produced with the encoding method and apparatus.

With the high-efficiency encoding method and apparatus of the present invention, a signal (which may be digital) is transformed into frequency components. The frequency components are separated into first spectral components which consist only of signal components of a specified band and encoded along with the information specifying the band and second spectral components normalized and quantized every pre-set encoding unit and encoded along with the quantization precision information. The quantization precision information of the second spectral components is encoded with a smaller number of bits for the high-range side than for the low-range side.

With the high-efficiency encoding method and apparatus of the present invention, the output signal is transformed into frequency components, and part or all of the frequency components are normalized and quantized for each of pre-set encoding blocks. For quantization, the quantization precision information is encoded by selecting an associated quantization precision information code from among re-set quantization precision information selecting branches comprised of plural quantization precision information data associated with plural quantization precision information codes for each set of contiguous encoding blocks. The boundary information specifying the boundary of the sets of the contiguous encoding blocks is also encoded.

The first spectral components are tonal components in a specified frequency exhibiting signal energy concentration. The encoding-block-based normalization and quantization is performed on the remaining frequency components separated from the tonal components in the specified frequency exhibiting signal energy concentration.

The quantization precision information codes are selected from among pre-set quantization precision information selecting branches comprised of plural quantization precision information data associated with plural quantization precision information codes for each set of contiguous encoding blocks. The boundary information specifying the boundary of the sets of the contiguous encoding blocks is also encoded. The information specifying the quantization precision information selection branches is also encoded. The number of the quantization precision information data contained in the quantization precision information selection branches is smaller for the higher-range side. The transform into the frequency components is by processing including orthogonal transform. The input signals are audio signals.

The high-efficiency decoding apparatus of the present invention decodes first spectral components made up only of frequency components of a specified range encoded along with the band-specifying information, and the quantization precision information codes, the corresponding quantization precision information of which has been encoded with a smaller number of bits for a higher range than for a lower range, is decoded. The second spectral components, made up of the frequency components obtained on normalization and quantization every pre-set encoding block and encoding, are decoded based upon the quantization precision information decoded from the quantization precision information codes, and the first and second spectral components, thus decoded, are synthesized.

The high-efficiency decoding apparatus of the present invention decodes the encoded boundary information specifying the boundary of sets of pre-set contiguous encoding blocks, and selects associated quantization precision information data from among pre-set quantization precision information selecting branches comprised of plural quantization precision information data associated with plural quantization precision information codes for each set of contiguous encoding blocks, for decoding the quantization precision information codes encoded from the quantization precision information and for decoding signals made up of frequency components obtained on normalization and quantization every encoding block based upon the quantization precision information decoded from the quantization precision information codes followed by encoding.

The first spectral components are tonal components in a specified frequency exhibiting signal energy concentration. The encoding-block-based normalization and quantization is performed on the remaining frequency components separated from the tonal components in the specified frequency exhibiting signal energy concentration.

The high-efficiency decoding apparatus of the present invention decodes the encoded boundary information specifying the boundary of sets of pre-set contiguous encoding blocks and, for decoding the quantization precision information codes, selects the quantization precision information associated with the quantization precision information codes from among pre-set quantization precision information selecting branches comprised of plural quantization precision information data associated with plural quantization precision information codes. The decoding apparatus also decodes the encoded information specifying the quantization precision information selection branches for each set of contiguous encoding blocks and specifies the quantization precision information selection branches for each set of the contiguous encoding blocks based upon the decoded specifying information. The number of the quantization precision information data contained in the quantization precision information selection branches is smaller for the higher-range side.

The signals made up of decoded frequency components are processed with inverse orthogonal transform. The input signals are audio signals.

The recording medium of the present invention comprises transmission media in general, and has recorded thereon signals encoded by the above-mentioned high-efficiency encoding method and apparatus of the present invention.

According to the present invention, the tonal components, which are acoustically crucial components, are separated from the spectrum and encoded independently of other spectral components. For encoding, the number of bits representing the high-range side quantization precision information is set so as to be smaller than the number of bits representing the low-range side quantization precision information, thereby increasing the coding efficiency.

According to the present invention, the number of bits representing the quantization precision information is rendered variable from band to band, and the boundary information specifying the boundary of transition of the numbers of bits is encoded for realizing efficient encoding with a wide degree of freedom conforming to characteristics of the input signals.

BRIEF DESCRIPTION OF THE DRAWINGS

FIG. 12 illustrates an example of the method for constructing a codestring according to a first embodiment.

DETAILED DESCRIPTION

The present invention is now described in detail with reference to the figures.

Figure 1:
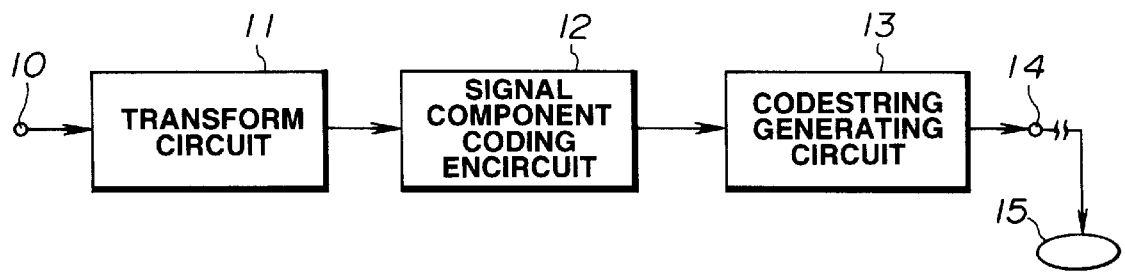
FIG. 1 is a block circuit diagram which shows a basic arrangement of a high efficiency encoder according to the present invention.

FIG. 1 is a block circuit diagram which shows a basic arrangement of a high-efficiency encoder according to an embodiment of the present invention. In the FIG. 1 encoder, a waveform signal (e.g., acoustic signals) is provided to the encoder via an input terminal 10. A transform circuit 11 converts the waveform signal into spectral components, which are provided to a signal component encoding circuit 12 for encoding. An output of the signal component encoding circuit 12 is provided to a codestring generating circuit 13, which generates a codestring. The generated codestring is output from the encoder at an output terminal 14. From the output terminal 14, the codestring is provided to an error correction circuit or a modulation circuit (not shown), for transmission or for recording onto a recording medium 15, which may be an optical disc.

Figure 2:
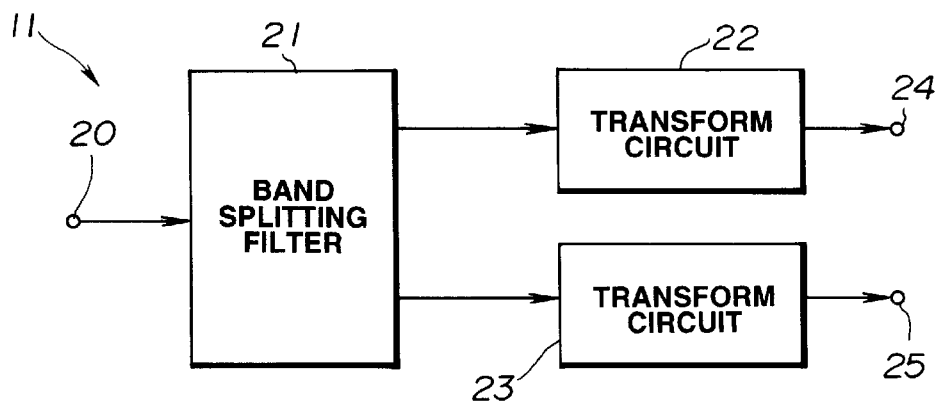
FIG. 2 is a block circuit diagram which shows an illustrative arrangement of the transform circuit of the FIG. 1 encoder.

FIG. 2 is a block circuit diagram which shows an illustrative arrangement of the transform circuit 11. Referring to FIG. 2, waveform signals entering an input terminal 20 are split, by a band splitting filter 21, into two frequency bands. The bandwidths of the two frequency bands are each one-half the bandwidth of the waveform signals supplied to the input terminal 20. The signals of the two frequency bands are provided to respective forward orthogonal transform circuits 22, 23. The orthogonal transform circuits orthogonally transform the frequency band signals using a process such as MDCT. The resulting spectral components, from the orthogonal transform circuits 22, 23 are provided to respective output terminals 24, 25 as the spectral components from the transform circuit 11 of FIG. 1. The spectral components are provided to the signal component encoding circuit 12 (FIG. 1). In FIG. 1, the spectral components of the two frequency bands from the forward transform circuits 22, 23 are provided as a single output of the transform circuit 11.

In an alternate embodiment, of the FIG. 1 transform circuit, the input signals may be directly transformed by MDCT into spectral components. In still further alternate embodiments, the input signals may be transformed by DFT or DCT. In a yet further alternate embodiment, the input signals may be split into band components by a band splitting filter alone. However, since the advantages of the high-efficiency encoding method of the present invention are most prominent when encoding signals exhibiting energy concentration in specified frequencies, the FIG. 2 embodiment, which can produce numerous frequency components with a relatively small amount of the processing operations, is a preferable one for transforming waveform signals into frequency components.

Figure 3:
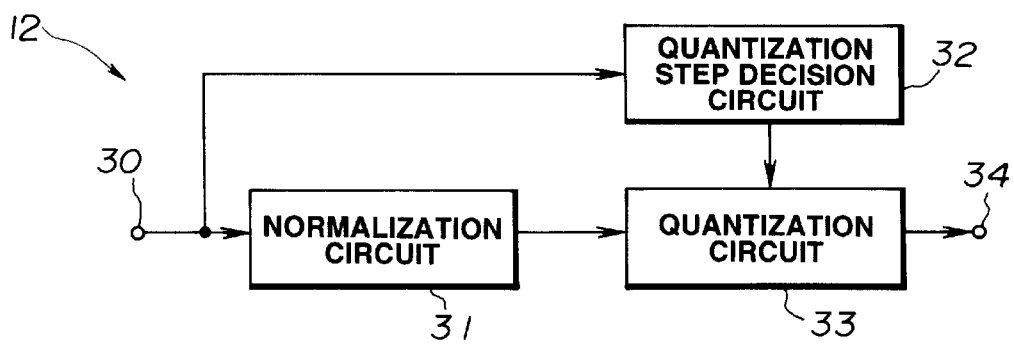
FIG. 3 is a block circuit diagram which shows a basic arrangement of a signal component encoding circuit of the FIG. 1 encoder, in accordance with an embodiment of the present invention.

FIG. 3 shows an illustrative arrangement of the FIG. 1 signal component encoding circuit 12. Referring to FIG. 3, the spectral components supplied from the transform circuit 11 via an input terminal 30, are normalized by a normalization circuit 31 from band to band. The normalized spectral components are provided to a quantization circuit 33. The spectral components are also routed from the from the input terminal 30 to a quantization step decision circuit 32. The quantization step decision circuit 32 calculates the number of quantization steps in the quantization circuit 33 (i.e., the quantization precision) based upon the spectral components. The quantization circuit 33 quantizes the normalized spectral component signals in accordance with the number of quantization steps calculated by the quantization step decision circuit 32. In addition to the quantized normalized spectral component signals, the quantization circuit 33 outputs the normalization coefficient information and the quantization precision information codes to a terminal 34. The normalization coefficient information includes encoded data of the number of normalization coefficients used in the normalization circuit 31, and the quantization precision information codes includes encoded data of the number of quantization steps (information on the quantization precision) calculated by the quantization step decision circuit 32. The signals output from the output terminal 34 are routed to the codestring generating circuit 13 of FIG. 1.

Figure 4:
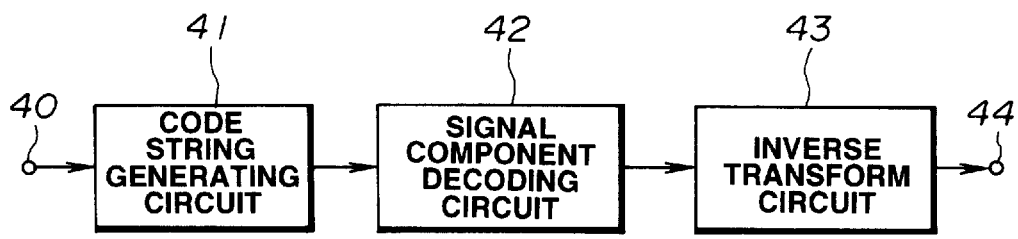
FIG. 4 is a block circuit diagram which shows a basic arrangement of a high efficiency decoder according to the present invention.

FIG. 4 is a block circuit diagram which shows a basic arrangement of a high efficiency decoder for reproducing signals from the codestring generated by the FIG. 1 encoding circuit. Referring to FIG. 4, the codestring generated by the FIG. 1 encoder (which has either been transmitted or recorded on a recording medium) is provided to an input terminal 40. The codestring is provided to a codestring resolving circuit 41, where the encoded codes of the respective spectral components, the quantization step information and the normalization coefficient information are separated and extracted. The encoded spectral components, quantization precision information and the normalization coefficient information, thus separated and extracted, are provided to a signal component decoding circuit 42. The signal component decoding circuit 42 decodes the encoded quantization precision information and normalization coefficient information and, using the decoded quantization precision information and normalization coefficient information, decodes the encoded spectral components to restore the original spectral components. These original spectral components are provided to an inverse transform circuit 43, which inverse transforms them into waveform signals. The waveform signals are provided, via an output terminal 44, to downstream side circuitry which further processes the waverform signals.

The recording medium may be, for example, a tape recording medium, an optical disc, a magneto-optical disc, a magnetic disc, a semiconductor memory or an IC card. The transmission medium may be, for example, an electric cable, an optical cable or electromagnetic radiation through the air.

Figure 5:
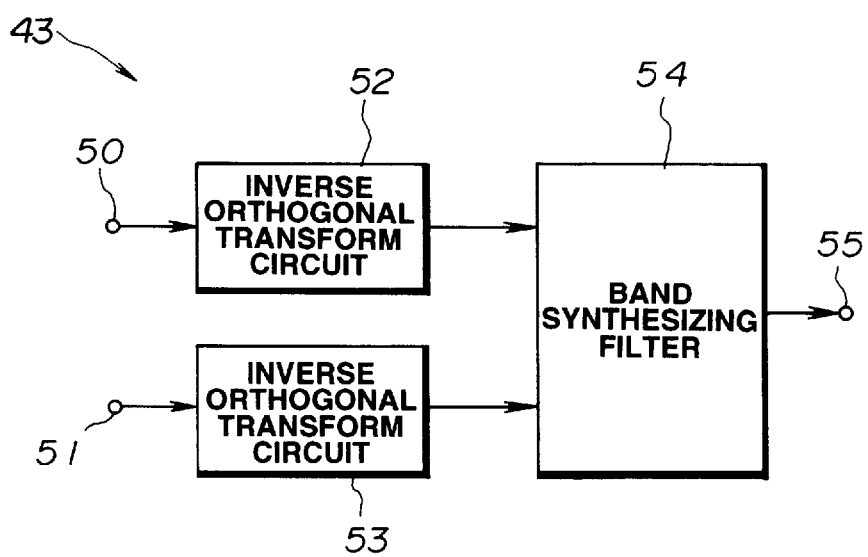
FIG. 5 is a block circuit diagram which shows an illustrative arrangement of an inverse transform circuit of the FIG. 4 decoder.

FIG. 5 is a block diagram which shows an illustrative arrangement of the FIG. 4 inverse orthogonal transform circuit 43, which performs an inverse orthogonal transform operation that is the reverse of the transform operation performed by the FIG. 2 transform circuit.

Referring to FIG. 5, the restored original spectral components (having been restored by the FIG. 4 signal component decoding circuit 42) are provided, via input terminals 50, 51, to inverse transform circuits 52, 53, respectively, to be inverse transformed. The signals of the respective frequency bands, have been inverse transformed by the inverse transform circuits 52, 53, are routed to a band synthesizing filter 54 where they are band-synthesized. The band synthesized signal are then provided to output terminal 55.

Having described basic embodiments of a high efficiency encoder (FIGS. 1–3) and a decoder (FIGS. 4 and 5), a high efficiency encoding method and a high efficiency decoding method, in accordance with the present invention. are now described. A conventional high efficiency encoding is first described by way of comparison.

Figure 6:
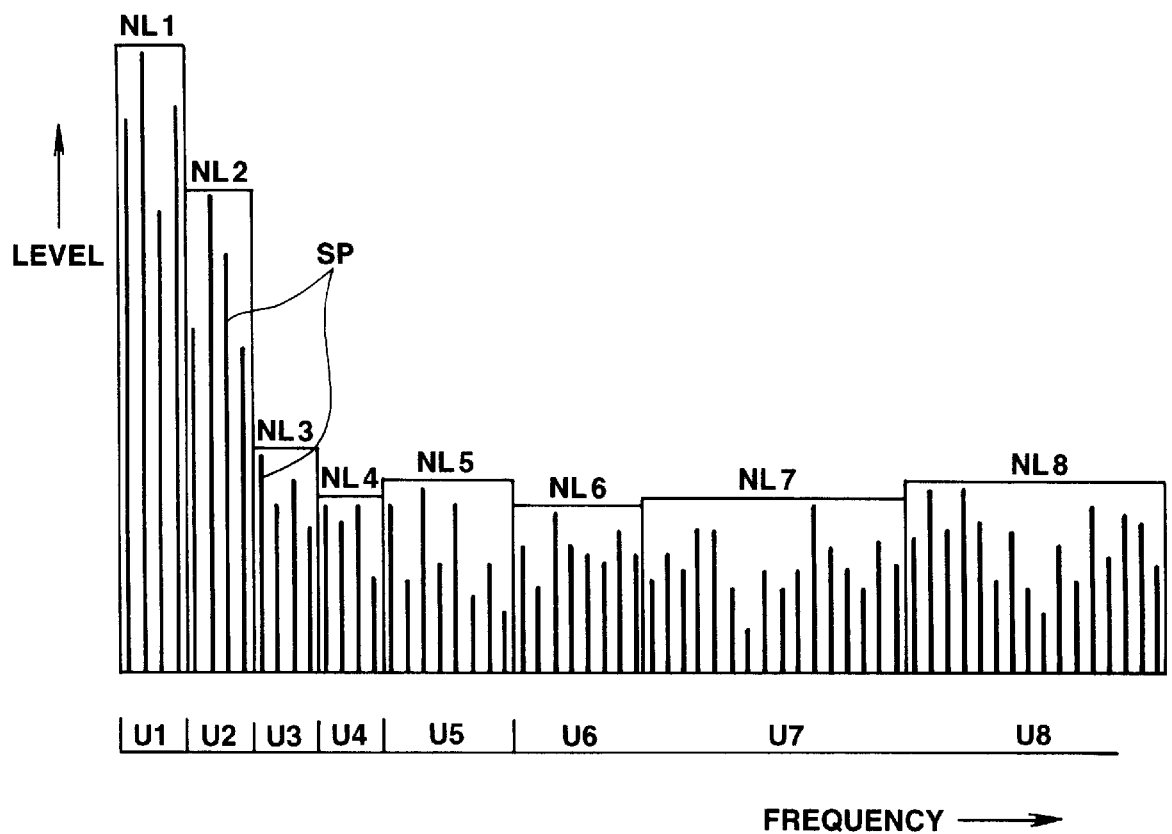
FIG. 6 illustrates a construction of a codestring according to the present invention.

FIG. 6 shows an example of spectral components SP that were obtained by transforming an input signal (e.g., by the FIG. 2 transform circuit 11). In FIG. 6, the levels of absolute values of the spectral components obtained by MDCT are represented in terms of decibels (dB). Specifically, the transform circuit 11 transforms the signals of two frequency bands by band splitting one time block of the input signal with the FIG. 2 band splitting filter 21, and transforming the band split signal into, for example, 64 spectral components SP with the FIG. 2 transform circuits 22, 23.

The spectral components SP are provided from the transform circuit 11 to the FIG. 3 signal component encoding circuit 12. The signal component encoding circuit 12 groups the 64 spectral components SP for each of the two frequency bands, provided from the transform circuit 11, into sixteen sub-bands (or "encoding blocks") of narrower bandwidths U1 to U8 as shown in FIG. 6. The spectral components SP of the respective encoding blocks are normalized by the FIG. 3 normalization circuit using normalization coefficients NL1 to NL8 that are associated with the encoding blocks U1 to U8, respectively. The normalized spectral components SP of the respective encoding blocks are then quantized by quantization circuit 33. The number of quantization steps (i.e., the quantization precision) are changed, by the quantization step decision circuit 32, from one encoding block to another depending upon the manner of distribution of the frequency components in the respective encoding blocks. Thus, deterioration in the sound quality is kept to a minimum while also allowing for acoustically efficient encoding. The bandwidths of the respective encoding blocks in the respective blocks are selected by the signal component coding circuit 12 to be narrower towards the low frequency ranges and broader towards the high frequency ranges. This enables generation of the quantization noisy to be controlled in keeping with psychoacoustic characteristics of the human auditory sense.

The relation between the number of quantization steps, that is the quantization step information, and the quantization step information codes generated by the codestring generating circuit 13 is explained with reference to Table 1.

TABLE 1

| number of bits of quantization precision information | quantization step information code | number of quantization steps |
|---|---|---|
| 3 | 000 | 1 |
|   | 001 | 3 |
|   | 100 | 7 |
|   | 011 | 15 |
|   | 100 | 31 |
|   | 101 | 63 |
|   | 110 | 127 |
|   | 111 | 255 |
| 2 | 00 | 1 |
|   | 01 | 3 |
|   | 10 | 7 |
|   | 11 | 255 |
| 1 | 0 | 1 |
|   | 1 | 3 |

Table 1 shows how the number of quantization steps, which varies from level 1 to level 255 may be represented in either 3 bits, 2 bits or 1 bit. Referring to Table 1, if the quantization step information codes are represented in three bits (from "000" to "111"), each corresponds to one of eight quantization step numbers of levels 1, 3, 7, 15, 31, 63, 127 and 255. On the other hand, if the quantization step information codes are represented in two bits (from "00" to "11") each code corresponds to one of four quantization step numbers of levels 1, 3, 7 and 255.

Finally, if the quantization step precision information codes are represented by only one bit ("0" and "1"), each code corresponds to one of the quantization step numbers of levels 1 and 3. Quantization of a particular encoding block with the quantization step number of level 1 means that the spectral components SP in that_____encoding block all have zero values.

Figure 7:
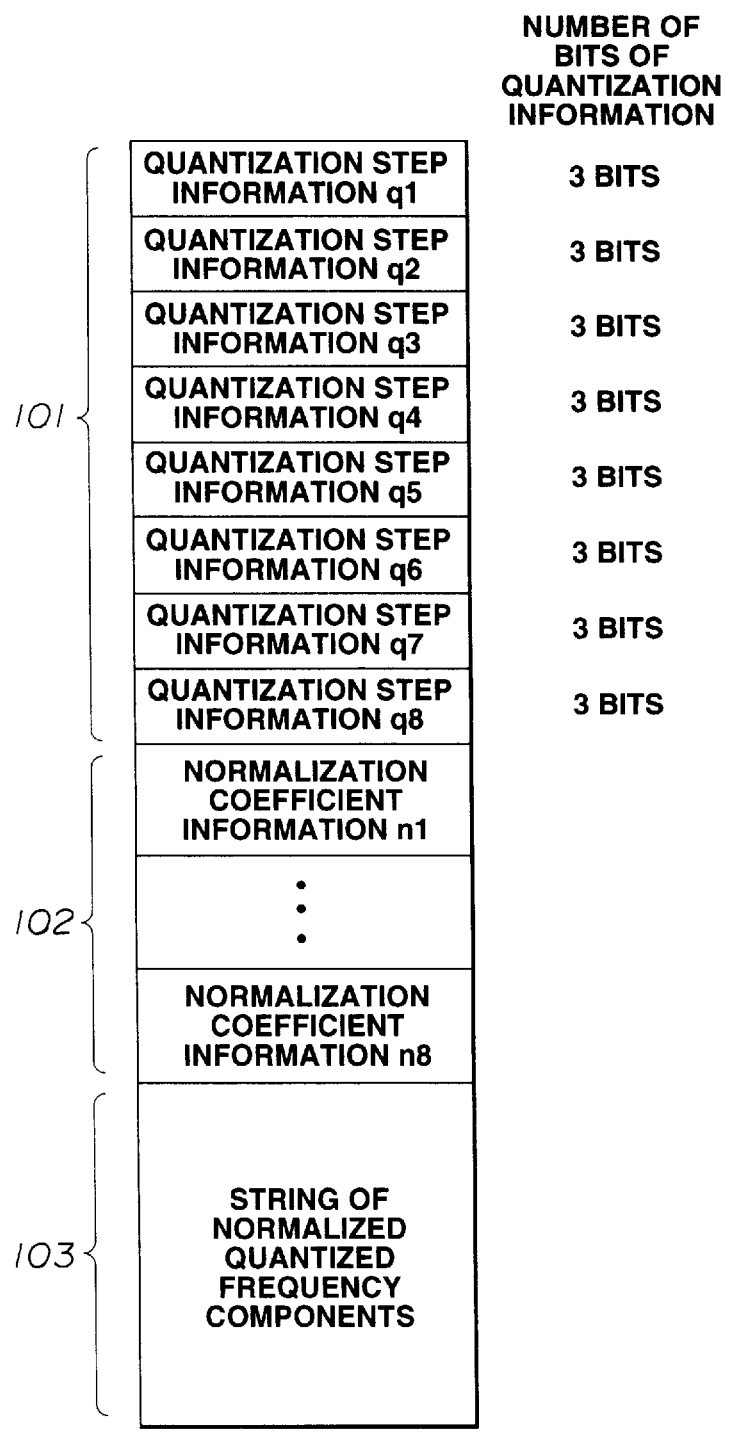
FIG. 7 illustrates an example of the construction of a codestring according to the present invention.
Figure 8:
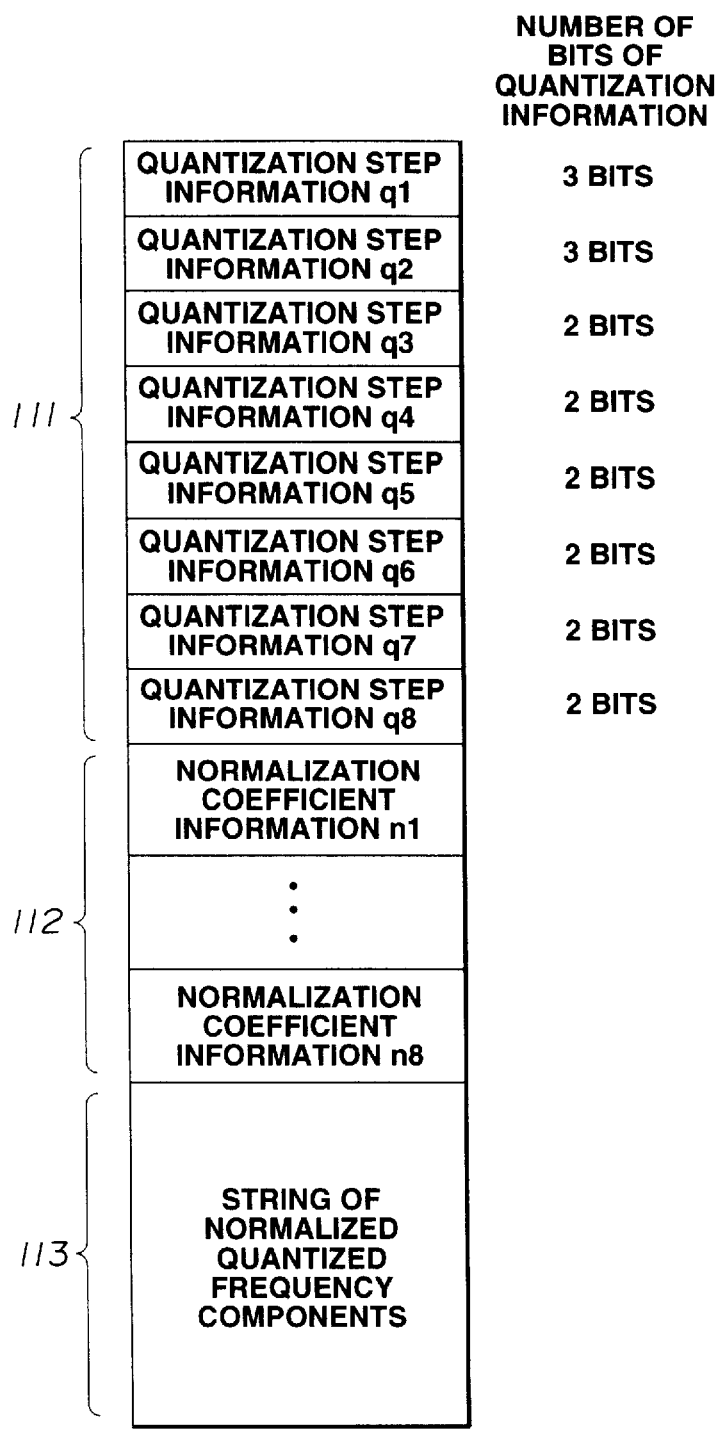
FIG. 8 illustrates another example of the construction of a codestring according to the present invention.

Conventionally, the number of quantizing steps used to encode U8 would each be represented in the same number of bits. For example, FIG. 7 shows a codestring obtained by coding the quantization step numbers of the encoding blocks U1 through U8 (quantization step information data q1 through q8, respectively) with 3-bit quantization step information codes using the conventional technique. On the other hand, in accordance with the invention, the number of quantizing steps used to encode each encoding block U1 through U8 may be represented in unequal numbers of bits, fewer bits being employed where less encoding resolution is required. FIG. 8 shows a codestring obtained by coding the quantization step numbers of two low-range encoding blocks U1 and U2 (quantization step information data q1 and q2) with 3-bit quantization step information codes and by coding the quantization step numbers of the remaining encoding blocks (quantization step information data q3 to q8) with 2-bit quantization step information codes.

In the codestrings of FIGS. 7 and 8, the quantization step information codes are entered in a quantization precision information region (101 in the FIG. 7 codestring, 111 in the FIG. 8 codestring), while the encoded normalization coefficient information data and strings of normalized quantized spectral components are entered in a normalization coefficient information region (102 in the FIG. 7 codestring; 112 in the FIG. 8 codestring) and in a normalized and quantized frequency component string region (103 in the FIG. 7 codestring; 113 in the FIG. 8 codestring), respectively.

Generally, the human auditory sense is known to be less sensitive to high frequency signal components than to low frequency range signal components. Furthermore, in a majority of cases, the signal energy is concentrated in the low frequency range. Thus, the number of quantization steps (quantization precision) need not be as high for the high frequency range as for the low frequency range. That is, encoding the high-range spectral components with quantization step information data in fewer bits has no deleterious effects on the sound later heard by the listener.

Thus, as for the high-range spectral components, the quantization precision information may be encoded with the information precision information codes represented with a smaller number of bits (e.g., 2 bits vs. 3 bits for the low frequency range spectral components) thus improving the encoding efficiency, as shown in FIG. 8.

Figure 9:
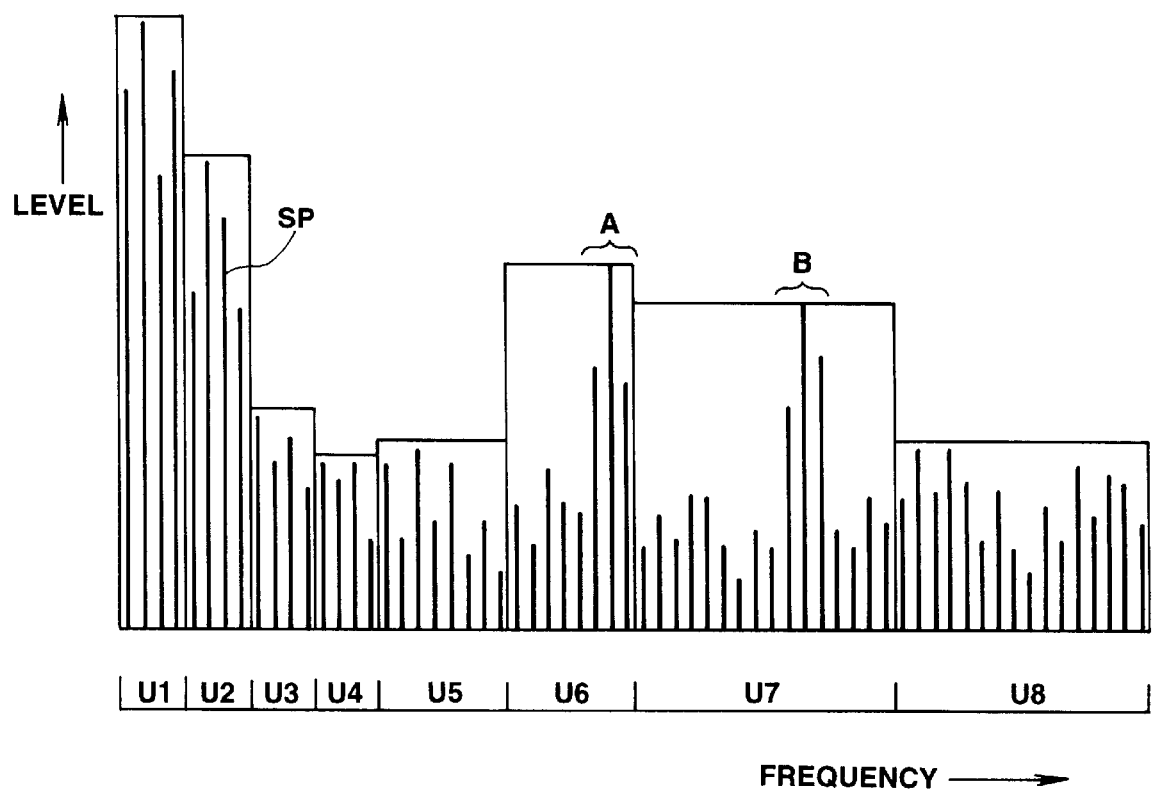
FIG. 9 illustrates an encoding method according to the present invention.

However, referring to FIG. 9, there are occasions where tonal components with concentrated energy, shown at A and B, are present in a relatively high range encoding block, such as encoding blocks U6 or U7. These tonal components are thus acoustically crucial components and must be encoded with sufficient quantization precision.

Using the number of quantization steps shown in FIG. 8 in which the quantization step information codes for the high range frequencies are all represented in two bits, quantization for encoding blocks having these tonal components with concentrated energy may be made with the maximum number of steps (level 255) specified by the quantization step information code "11" (Table 1). This, however, lowers the encoding efficiency since the spectral components in the same block are quantized with quantization precision which is higher than is necessary.

Taking this into consideration, with the high-efficiency encoding method according to the first embodiment of the present invention, it is determined which spectral components are "tonal components" in need of high quantization precision, for assuring sound quality. In encoding the number of quantization steps (quantization precision information) for the other "non-tonal" components, the numbers of quantization steps are encoded with the quantization precision information codes represented with a smaller number of bits.

Figure 10:
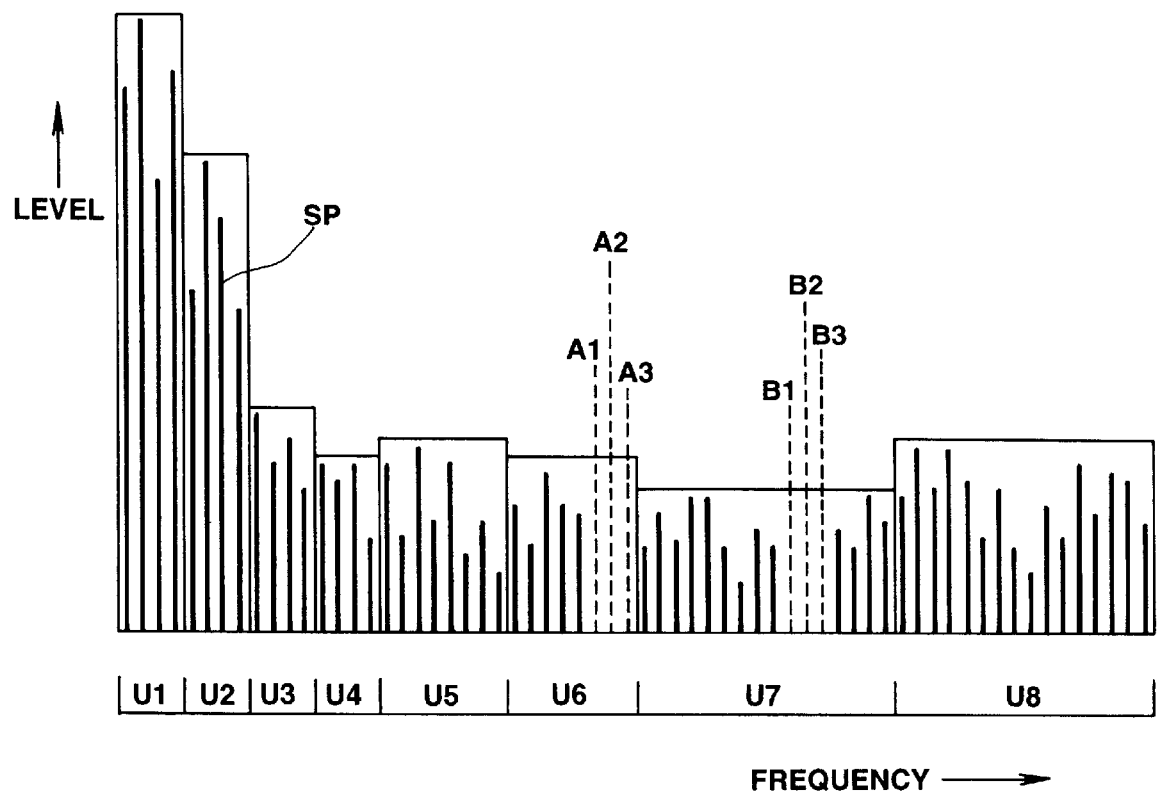
FIG. 10 illustrates an encoding method according to the present invention in more detail.

Referring to FIG. 10, determining which spectral components are "tonal components," in need of high quantization precision and which are "non-tonal components," (i.e., noisy components), is discussed.

The tonal components are those spectral components that exhibit concentrated energy distribution. In the present embodiment, 3 to 8 frequency components exhibiting the highest concentrated energy distribution are separated out as being tonal components.

Referring to FIG. 10, the spectral components A1, A2 and A3 in the encoding block U6 (indicated by broken lines) and the spectral components B1, B2 and B3 in the encoding block U7 (also indicated by broken lines) are the tonal components. It is apparent from FIG. 10 that if the tonal components indicated by the broken lines are separated out, the absolute values of the remaining spectral components in the encoding block which contain the tonal components is smaller, so that the normalization coefficients may be diminished. Thus, if lower quantization precision after normalization is used, the quantization noisy level which is subsequently generated is the same as would be generated when sufficient quantization precision is used (FIG. 9).

In addition, for the encoding blocks that contain tonal components and for neighboring blocks, the masking effect of the tonal components is such that, even if the number of quantization steps for those encoding blocks is set to 1 so that the amplitude of all of the spectral components other than the tonal components is set to 0, there is only small deterioration in the sound quality ultimately perceived by the listener.

Thus, by separating out the tonal components and by quantizing and encoding the remaining non-tonal spectral components, it becomes possible to maintain lower quantization precision (smaller quantization step numbers) in encoding blocks that are in the vicinity of the encoding blocks that contain tonal components. Thus, for those encoding blocks, a smaller number of bits suffices for representing the quantization precision (number of quantization steps). In other words, it becomes possible to use quantization precision information codes that can be represented by a smaller number of bits.

In a majority of cases, the tonal components are fundamental wave components and high harmonic components thereof which are attenuated at higher frequencies. Thus, for those high-range tonal components that have a high signal level, the frequency of the fundamental wave component is usually high enough that the high frequency range tonal components are significantly spaced apart from one another on the frequency axis.

Thus, the tonal components on the high frequency end are easier to separate from the non-tonal components than the tonal-components on the low frequency end. In addition, taking into account the psychoacoustic characteristics of the human acoustic sense, the encoding block widths are selected to be broader on the high frequency range side, based upon the critical bandwidth. Thus it is more effective to separate the tonal components on the high frequency range side, for raising the encoding efficiency.

The high efficiency encoder having the basic arrangement as shown in FIG. 1 for carrying out the high efficiency encoding method of the present invention is explained in more detail with reference to FIG. 11.

Figure 11:
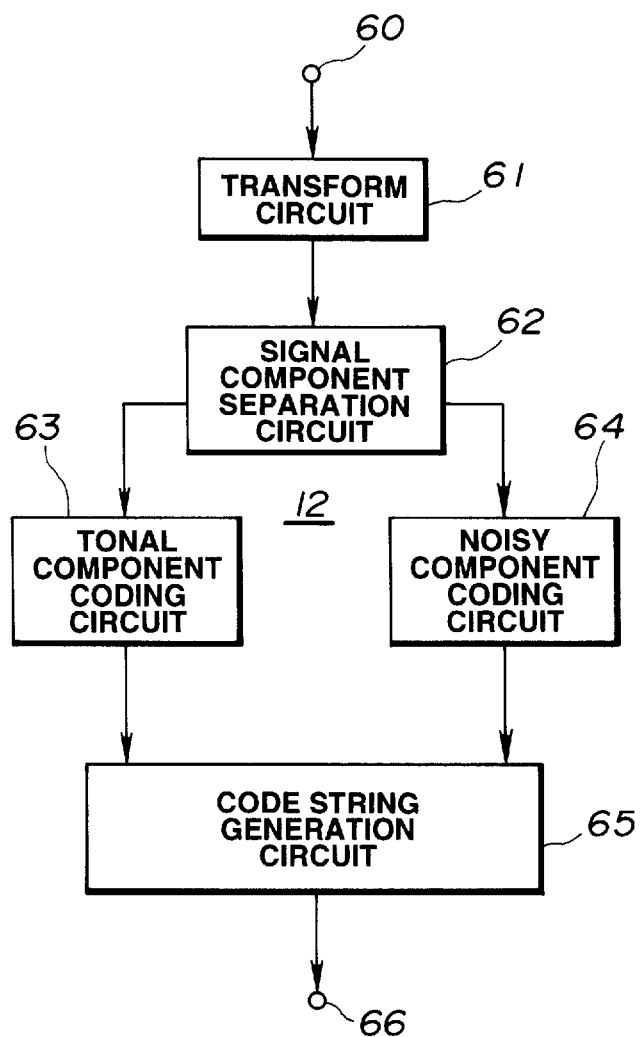
FIG. 11 is a block circuit diagram showing an illustrative arrangement of first and second embodiments of the high efficiency encoder according to the present invention.

Referring to FIG. 11, waveform signals, such as analog acoustic signals, are provided at an input terminal 60. These acoustic signals are transformed into spectral components by a transform circuit 61 which may be similar to the transform circuits shown in FIGS. 1 and 2. These spectral components are provided to a signal component separating circuit 62 which is provided within the signal component encoding circuit 12 of FIG. 1.

The signal component separating circuit 62 separates the spectral components into tonal components, which exhibit steep spectral distribution and other spectral components, which are noisy components that exhibit flat spectral distribution. That is, the signal component separating circuit 62 separates the spectral components supplied thereto into tonal components made up of a pre-set smaller number (e.g., 3 to 8) spectral components that exhibit concentrated energy distribution and the remaining noisy components. The tonal components and the noisy components are transmitted to the tonal component encoding circuit 63 and to the noisy component encoding circuit 64, respectively.

The tonal component encoding circuit 63 and the noisy component encoding circuit 64 have the same basic construction as the corresponding circuits shown in FIG. 3, and they perform the above-mentioned normalization and quantization on the tonal components and on the noisy components respectively supplied thereto. However, the tonal component encoding circuit 63 processes only the tonal components, while the noisy component encoding circuit 64 processes the noisy components after separation of the tonal components. Since the absolute values of the remaining spectral components in the encoding block which contained the tonal components are relatively smaller than the absolute values of the tonal components themselves, a smaller value normalization coefficient may be employed for these encoding blocks.

It is to be understood that the term "noisy components" are spectral components which may or may not be representative of "noise" (such as quantization noise or thermal noise) but, rather, may consist solely of lower energy spectral components.

On the other hand, if low quantization precision after normalization is used for each encoding block (i.e., a smaller number of quantization steps is used), the quantization noisy which is subsequently produced may be maintained at the same level as that when the tonal components have not been separated but a higher quantization precision is employed. Thus, the noisy component encoding circuit 64 uses coarse quantization precision after normalization in each encoding block.

In addition, in the encoding blocks neighboring to the encoding blocks containing the tonal components, the masking effect of the tonal components is such that the signal is perceived as being scarcely deteriorated by the listener. Thus the noisy component encoding circuit 64 sets to 1 the number of quantization steps of these neighboring encoding blocks, while setting the amplitudes of these noisy components to 0.

Thus, in the high efficiency encoding method and apparatus of the first embodiment shown in FIG. 11, since the tonal components are separated and the remaining spectral components (i.e., the noisy components) other than the separated tonal components are quantized and encoded encoding block by encoding block, it becomes possible to maintain a coarse quantization precision in the encoding blocks that are in the vicinity of encoding blocks that contain tonal components and, hence, to use quantization step information codes represented by a smaller number of bits. That is, with the high efficiency encoding method and apparatus of the first embodiment, it becomes possible to maintain a high degree of freedom in controlling quantization precision and to achieve efficient encoding while the number of bits representing the quantization precision information is maintained at a relatively low value.

The tonal component encoding circuit 63 and the noisy component encoding circuit 64, in addition to providing the respective quantized spectral components to a codestring generating circuit 65, also provide the respective encoded normalization coefficient information and quantization precision information data to the codestring generating circuit 65. The codestring generating circuit 65 is identical, or similar to, the FIG. 1 codestring generating circuit 13.

The codestring generating circuit 65 generates the codestring shown in FIG. 12 from the above-mentioned signals supplied thereto. That is, the codestring generating circuit 65 arrays, at a leading end for each block, both the tonal component information 121 obtained from encoding the separated tonal components and the information specifying the band(s) of the tonal components. The noisy component information obtained from encoding the remaining noisy components are arrayed next. In particular, the encoded noisy component information includes the quantization step information codes 122 (q1 to q8) for each encoding block; the normalization coefficient information 123 (n1 to n8) for each encoding block; and a string 124 of the normalized and quantized spectral components.

In the example of FIG. 12, the quantization step information codes q1 and q2, for the FIG. 10 low-range encoding blocks U1 and U2, respectively, are each represented by 3 bits. The quantization step information codes q3 to q8, for the remaining FIG. 10 encoding blocks U3 to U8, respectively, are each represented by 1 bit.

The tonal component information 121 includes band specifying information which specifies from which band the tonal components came; the number of bands having tonal components. For each band having tonal components, the tonal component information 121 includes the encoded quantization step information and normalization coefficient information. For each respective tonal component within the band, the tonal component information 121 includes normalized quantized frequency component information obtained when normalizing and quantizing the tonal components.

Taking the example of FIG. 10, since there is at least one tonal component in each of the encoding blocks U6 and U7, the number of tonal component information data is 2. The number of the tonal component information data is followed by the quantization step information qA; the normalization coefficient information nA; and the band-specifying information 1A pertaining to the encoding block U6. Then follows the normalized and quantized frequency component information data SA1, SA2 and SA3, for each of the three spectral components A1, A2 and A3 which are the tonal components in the encoding block U6.

Similarly, for the encoding block U7, the tonal component information 121 includes the quantization step information qB; the normalization coefficient information nB; and the band-specifying information 1B pertaining to the encoding block U7. Then follows the normalized and quantized frequency component information SB1, SB2 and SB3, for each of the three spectral components B1, B2 and B3 which are the tonal components in the encoding block U7.

The band-specifying information may be, for example, merely the smallest spectral component number.

Figure 13:
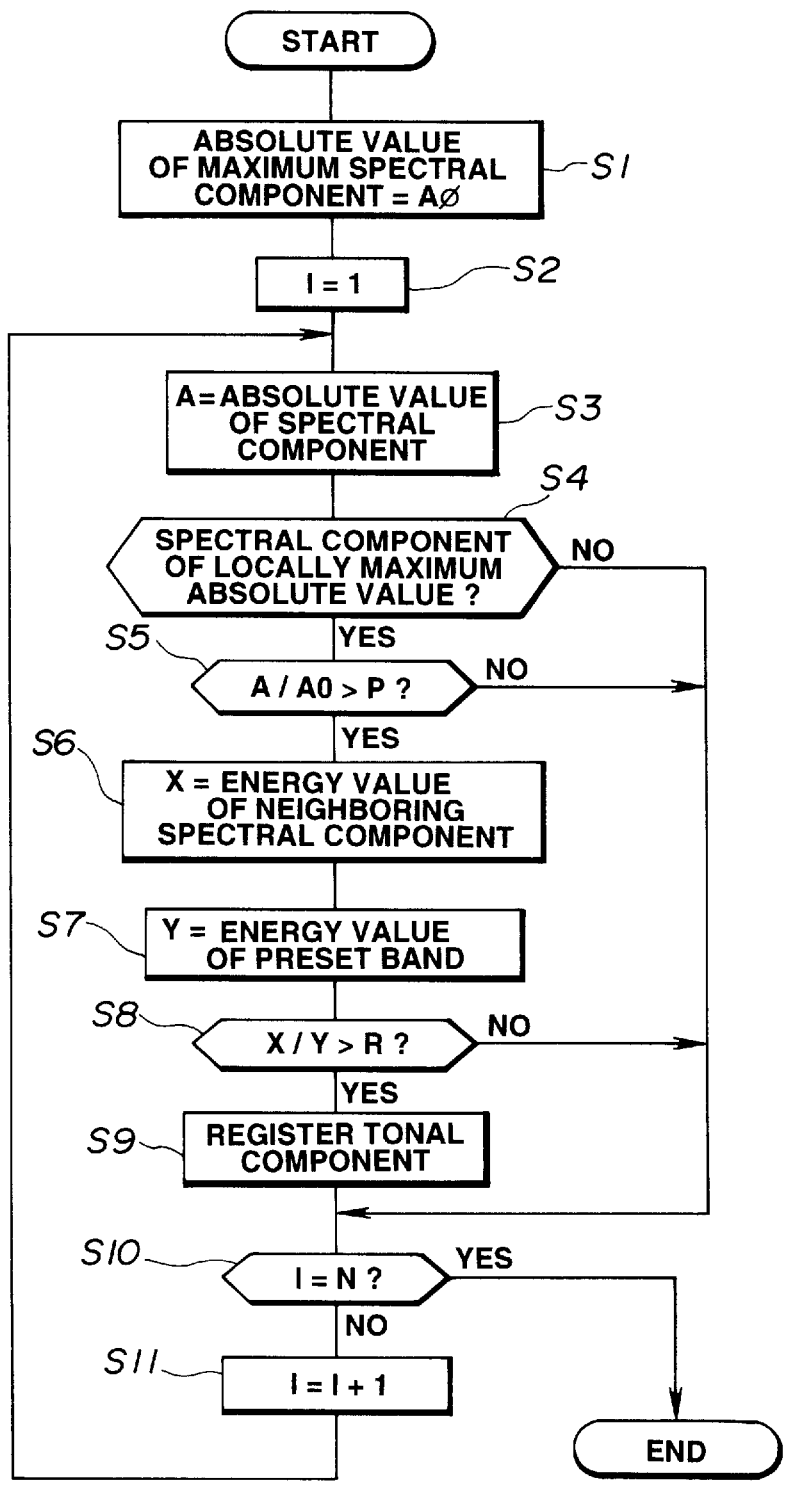
FIG. 13 is a flowchart showing the processing flow of signal component separation in the first and second embodiments.

A process by which the signal component separating circuit 62 (FIG. 11) may separate the tonal components from the spectral components is explained with reference to FIG. 13. In FIG. 13, I denotes the "number" of a particular spectral component. This may be, e.g., a separate serial number assigned to each frequency component as counted from the low frequency side. N denotes the total number of spectral components and P and R denote pre-set coefficients.

In general, a tonal component is a spectral component which meets the following conditions. First, the absolute value of the spectral component is locally larger than the remaining spectral components in the encoding block. Second, the spectral component is larger than a pre-set fraction of the absolute value of the largest spectral component in the encoding block. Third, the energy sum of the spectral component and neighboring components (e.g., both spectral components which neighbor it) is larger than a pre-set fraction of the energy in the encoding block. In addition, the neighboring spectral components are also deemed to be tonal components.

The width of each pre-set band which is to be used as a basis for comparison of the ration of energy distribution (i.e., the encoding block) may be selected to be narrower for lower frequency ranges and wider for higher frequency ranges. Such a selection is in general consistent with the bandwidth of critical bands previously described. That is, particular encoding bands may be determined in accordance with the psychoacoustic properties of the human auditory sense as discussed above.

Referring still to FIG. 13, at step S1, the absolute maximum value of spectral components in a time block, termed the maximum spectral absolute value, is set to A0. The value of A0 is a preset parameter. At step S2, the number I of the spectral component is initialized to one.

At the next step, S3, the variable A is set to be the absolute value of the I-th spectral component I. At step S4, it is determined whether or not the spectral absolute value A is the locally maximum absolute spectral value by comparing it to the absolute value of the other spectral components of the encoding block. If the result of the determination at step S4 is NO (that is, if it is determined that the spectral absolute value A is not the locally maximum absolute spectral value), the program skips to step S10. If the result of judgment at step S4 is YES, the program transfers to step S5.

At step S5, it is determined whether A/A0>P. That is, it is determined if the spectral absolute value A is larger than the absolute maximum value of spectral components in the encoding block, by a pre-set value P. If the result of the step S5 determination is NO, the program skips to step S10. If the result of the step S5 determination judgment is YES, the program transfers to step S6.

At step S6, the energy sum of the spectral components neighboring the spectral component I (which has been determined to have the locally maximum absolute spectral value) is found and assigned to the variable X. This energy sum X is termed the neighboring spectral energy value.

At step S7, the total energy value in the encoding block containing the spectral component I and the neighboring spectral components is determined and assigned to the variable. This total energy value Y is termed the energy value of the pre-set band.

At the next step S8, it is determined whether X/Y>R, that is whether the energy sum X of the spectral component corresponding to the locally maximum absolute spectral value and the neighboring spectral components is larger than the total energy Y of the pre-set band (encoding block) containing these frequency components by a preset ratio R. If the result of the step S8 determination is NO, the program skips to step S10. If the result of the step S8 determination is YES, the program transfers to step S9.

At step S9, the spectral component I and the neighboring spectral components are registered as being tonal components.

At the next step S10, it is determined whether all of the spectral components of the encoding block have been inspected by determining whether the serial number I of the spectral component is equal to the total number N of the spectral components. If the result of the step S10 determination is NO, the number I is incremented by 1. The program then reverts to step S3. On the other hand, if the result of the step S10 determination is YES, the processing of the tonal components in the encoding block is terminated. The program then processes the tonal components of the next encoding block.

Figure 14:
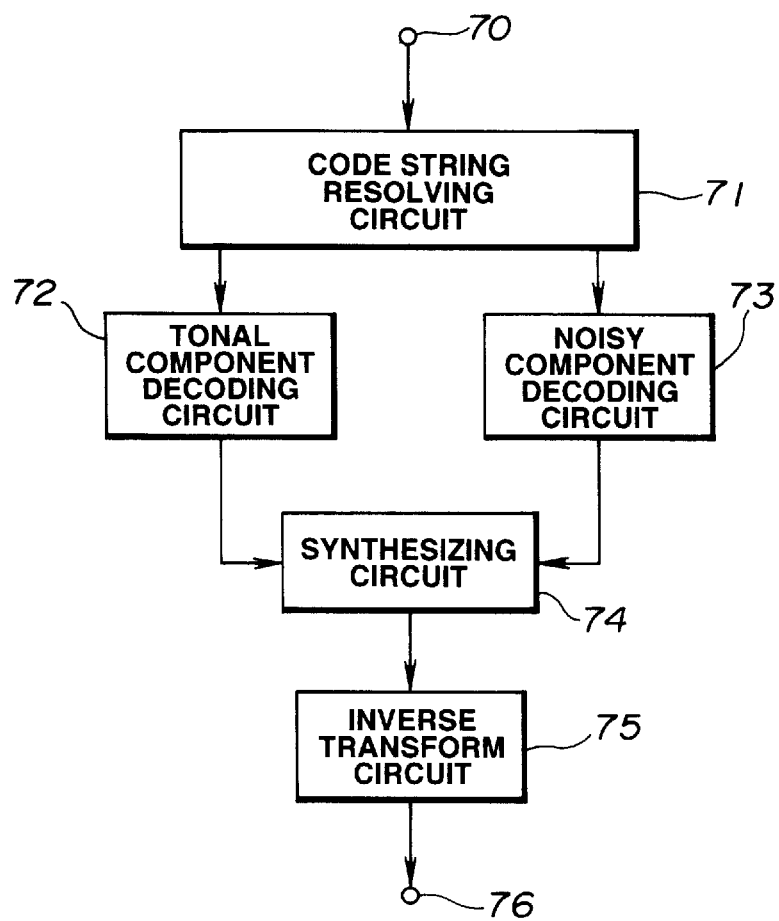
FIG. 14 is a block circuit diagram showing an illustrative arrangement of first and second embodiments of a high efficiency decoder according to the present invention.

FIG. 14 illustrates, in greater detail, a particular embodiment of the FIG. 4 high efficiency decoder. The FIG. 14 high efficiency decoder performing decoding which is the reverse of the encoding performed by the FIG. 11 high efficiency encoder.

Referring to FIG. 14, the FIG. 12 codestring, generated by the FIG. 11 high efficiency encoder and either transmitted or recorded on a recording medium, is supplied to an input terminal 70. A codestring resolving circuit 71 resolves the codestring into the encoded tonal component information and the other noisy component information. The encoded tonal component information and the other noisy component information are provided from the codestring resolving circuit 71 to a tonal component decoding circuit 72 and to a noisy component decoding circuit 73, respectively.

The tonal component decoding circuit 72 and the noisy component decoding circuit 73 each decode the encoded quantization precision portion and the normalization coefficient portion of the respective provided encoded information. Using the decoded quantization precision information and the normalization coefficient information, the decoding circuits 72, 73 process the normalized and quantized frequency component portions of the provided information by executing a decoding operation which is the reverse of the encoding operation performed by the FIG. 11 encoder. Both the tonal component decoding circuit 72 and the noisy component decoding circuit 73 contain therein a table corresponding to Table 1 (quantization step information selection branches) so that the quantization step information number can be determined by selecting from the table the quantization step information number associated with the quantization step information code. The decoded tonal components and noisy components are provided to a synthesizing circuit 74, where the decoded tonal components and noisy components are synthesized by a synthesizing operation which is the reverse of the separating operation performed by the FIG. 11 signal component separating circuit 62. That is, the synthesis circuit 74 synthesizes the decoded tonal components and noisy components to reconstruct the spectral components of the encoding block as they were prior to separation by the signal separating circuit 62 (FIG. 10).

With reference again to FIG. 14, the synthesized output of the synthesizing circuit 74 is provided to the inverse transform circuit 75, which is similar to the FIGS. 4 and 5 inverse transform circuits, to inverse transform the synthesized output into waveform signals. The waveform signals are provided to an output terminal 76.

Although an embodiment of the invention in which the tonal components and the noisy components are synthesized together by the synthesizing circuit 74 and inverse transformed by the inverse transform circuit 75 is shown in FIG. 14, it is also possible to first inverse transform the tonal and noisy components and, then, to subsequently synthesize the inverse transformed tonal and noisy components. The process of inverse transform and synthesis may also be carried out simultaneously instead of separately performing the two operations.

A second embodiment of the high efficiency encoding according to the present invention now discussed. With the high efficiency encoding method according the second embodiment of the present invention, the method of representation in which the numbers of quantization steps (quantization precision information) are encoded to the quantization precision information codes is as shown in Table 2:

TABLE 2

| quantization step information table selection codes | numbers of bits of quantization step information | quantization step information codes | numbers of quantization steps |
|---|---|---|---|
| 00 | 3 | 000 | 1 |
|  |  | 001 | 3 |
|  |  | 010 | 7 |
|  |  | 011 | 15 |
|  |  | 100 | 31 |
|  |  | 101 | 63 |
|  |  | 110 | 127 |
|  |  | 111 | 255 |
| 01 | 2 | 00 | 1 |
|  |  | 01 | 3 |
|  |  | 10 | 7 |
|  |  | 11 | 255 |
| 10 | 1 | 0 | 1 |
|  |  | 1 | 3 |

In Table 2, similar to Table 1, the quantization step information codes are represented by either 3 bits, 2 bits or 1 bit, as indicated by the quantization precision information table selection codes.

With the second embodiment, input signals may be efficiently encoded by varying the boundary of transition of the numbers of bits of the quantization step information codes.

Figure 15:
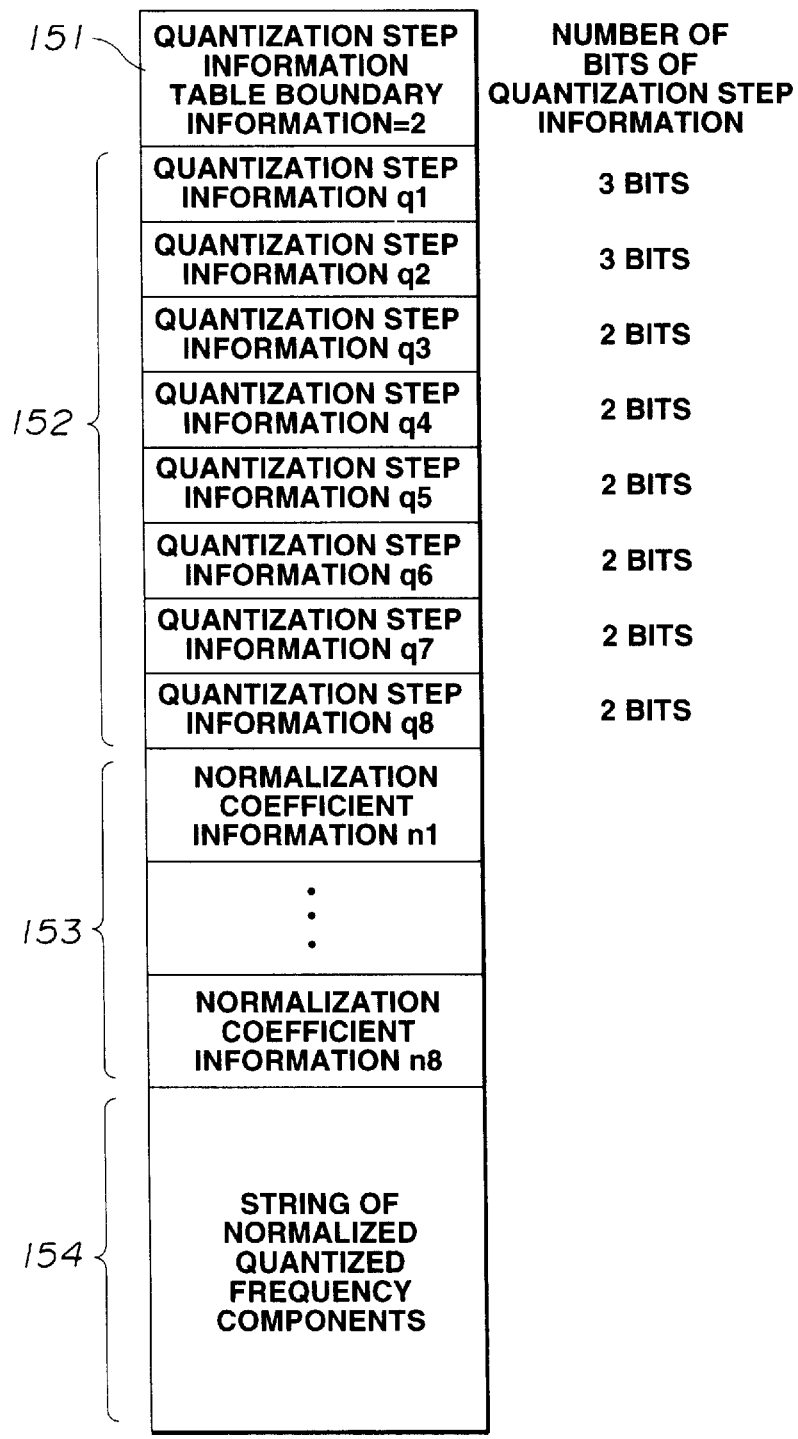
FIG. 15 illustrates a first illustrative example of a codestring arrangement in a second embodiment of the present invention.

FIG. 15 shows an illustrative example of a codestring generated by the high efficiency encoding method in accordance with the second embodiment. As can be seen with reference to Table 2, the quantization step information codes from "000" to 111 for the low frequency range encoding blocks, are associated with the quantization step information table selection code "00" of Table 2. The quantization step information codes "00" to "11", for the high frequency range encoding blocks, are associated with the quantization step information table selection code "01" of Table 2.

Referring now to FIG. 15, quantization step information table boundary information 151 is arrayed at the leading end of the FIG. 15 table. This information specifies the transition boundary of the numbers of bits of quantization step information codes.

That is, in the FIG. 15 example of the second embodiment, 3 bits and 2 bits are afforded to the quantization step information codes for the low-range encoding blocks and for the high-range encoding blocks, respectively. It is optional as to where the transition from three bits (for low range) and two bits (for low range) occurs. For this reason, the boundary between the low-range encoding blocks and the high-range encoding blocks is specified by the quantization step information table boundary information 151. Although it may be envisaged to set the respective quantization step information data 152 to a fixed length, such as 3 bits, in place of using the boundary information, this would require as many as 6 redundant bits for eight encoding blocks. By contrast, if the quantization step information table boundary information 151 is used, only 3 bits are required. Thus difference becomes more pronounced in actual application where there are a larger number of encoding blocks.

Thus, with the second embodiment, it becomes possible to encode the FIG. 6 spectral components with sufficient sound quality while minimizing the quantity of subsidiary information required to represent the quantization precision (number of quantization steps) in the quantization step information codes.

Thus, with the second embodiment, it is sufficient to set the value of the quantization step information table boundary information 151 of FIG. 15 to 7 instead of 2 (the quantization step information table boundary information= 7) and to select the quantization precision information codes from the quantization step information table associated with the quantization step information selection code of "000" in Table 2. This provides a necessary and sufficient quantization precision to be selected for the encoding blocks U6 and U7 of FIG. 9.

Figure 16:
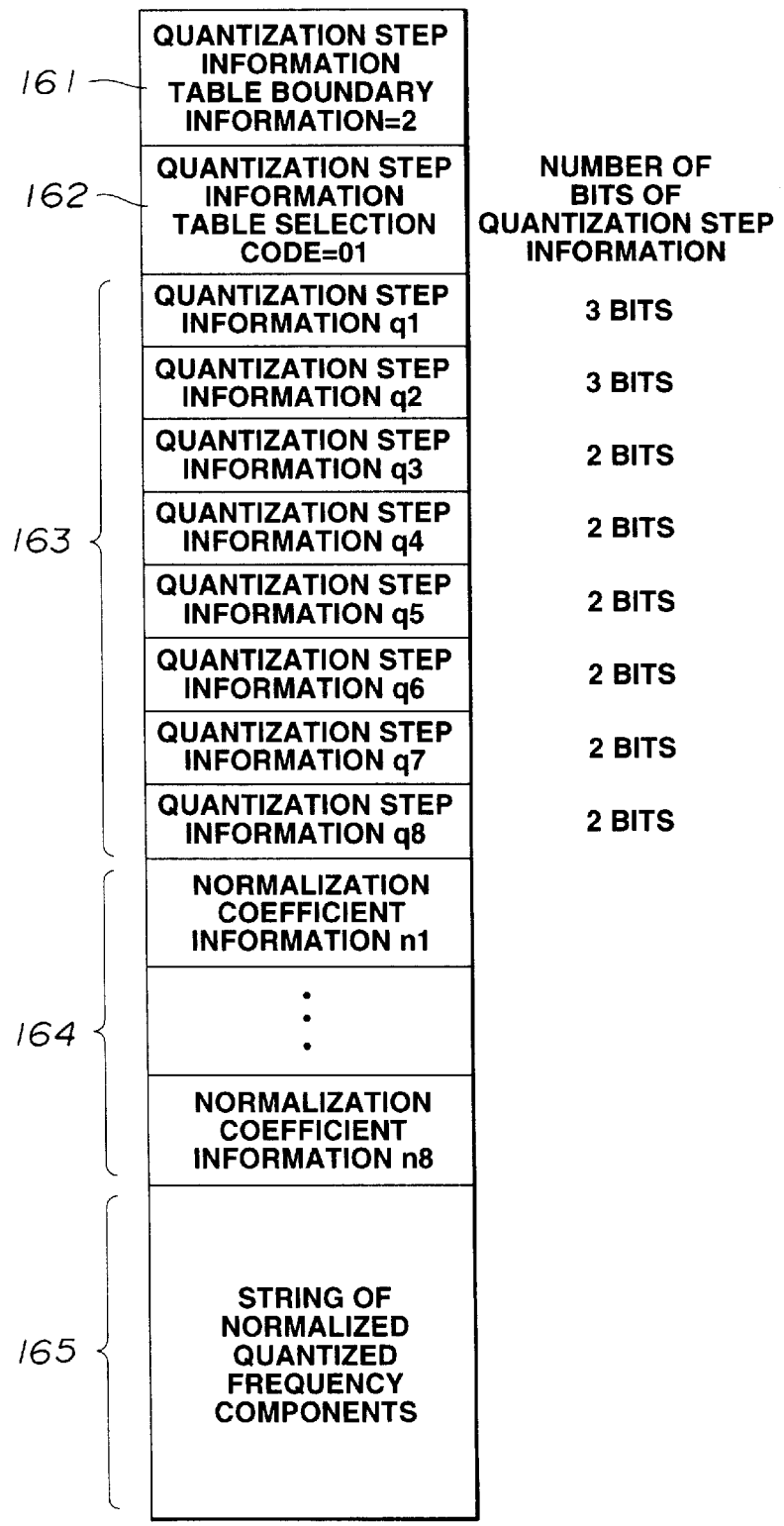
FIG. 16 illustrates a second illustrative example of a codestring construction according to the second embodiment.

FIG. 16 shows a codestring of a second example generated by the second embodiment high efficiency encoding method.

With the codestring of the FIG. 16 example, a quantization step information table selection code 162, set to "01", is arrayed after the a quantization step information table boundary information 161. In general, it is possible to select the associated quantization step information table (00 to 11) of Table 2.

The low-range side quantization step information table selection code "00" may be arranged ahead of the quantization step information table boundary information 161 in order to permit selection of the quantization step information table (000 to 111) of Table 2.

Although only one quantization step information table boundary (the boundary in the frequency domain of transition of the number of bits of the quantization step information) is provided in the illustrative examples of FIGS. 15 and 16, two or more boundary information data may be provided and, in addition, may be varied from encoding block to encoding block. If the boundary information data is to be varied from block to block, it is sufficient if the boundary information data is encoded and arrayed at the leading end of the codestring for each encoding block.

The high efficiency encoding method in accordance with the second embodiment of the present invention is now explained with reference to FIG. 17, which shows the processing flow for determining the quantization precision information table boundary M.

The position M of the quantization step information table boundary is determined with particular reference to the principle that a smaller number of bits is required to represent the quantization step information of a particular encoding block if the energy of the encoding block is lowered by separating out the tonal components (as in the first embodiment). The processing of FIG. 17 determines the extent of low-range encoding blocks with which the quantization precision information table may be employed.

Figure 17:
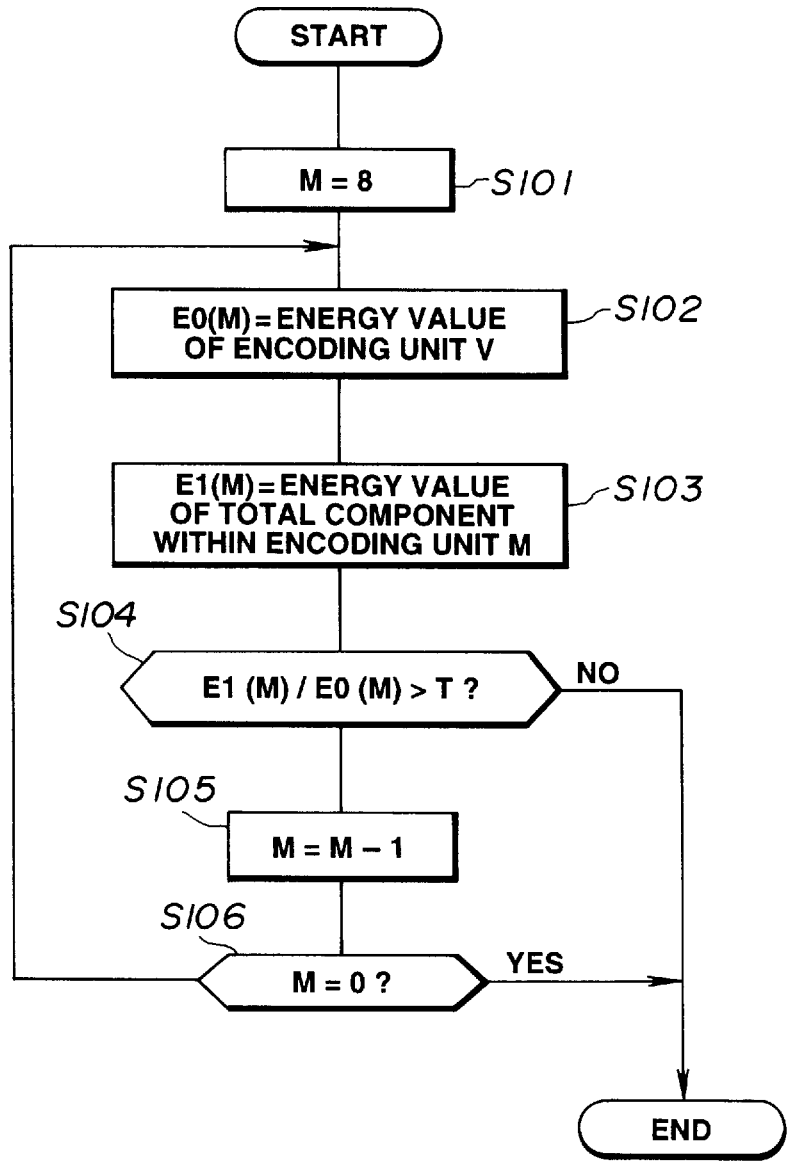
FIG. 17 is a flowchart which illustrates the processing flow for deciding the boundary in a quantization step information table in the second embodiment.

Referring to FIG. 17, the position M of the quantization step information table boundary is initialized, at step S101, to 8 corresponding to the high-range side encoding block. At the next step S102, the energy value of the encoding block of the number corresponding to the position M is determined and this value is given to E0(M). At step S103, the energy value of the tonal component in the encoding block of the number corresponding to the position M is determined and this value is given to E1(M).

At step S104, E1(M)/E0(M) is compared to a pre-set coefficient T (E1(M)/E0(M)>T?). If the result of the comparison of step S104 is YES, the program transfers to step S105.

At step S105, M is decremented by 1. The program then transfers to step S106. If, at step S106, M is equal to 0. If not, the program reverts to step S102.

If the result of decision at step S104 is NO, or if the result of decision at step S106 is YES, the FIG. 17 processing comes to a close. Then, the next time block is processed.

Figure 18:
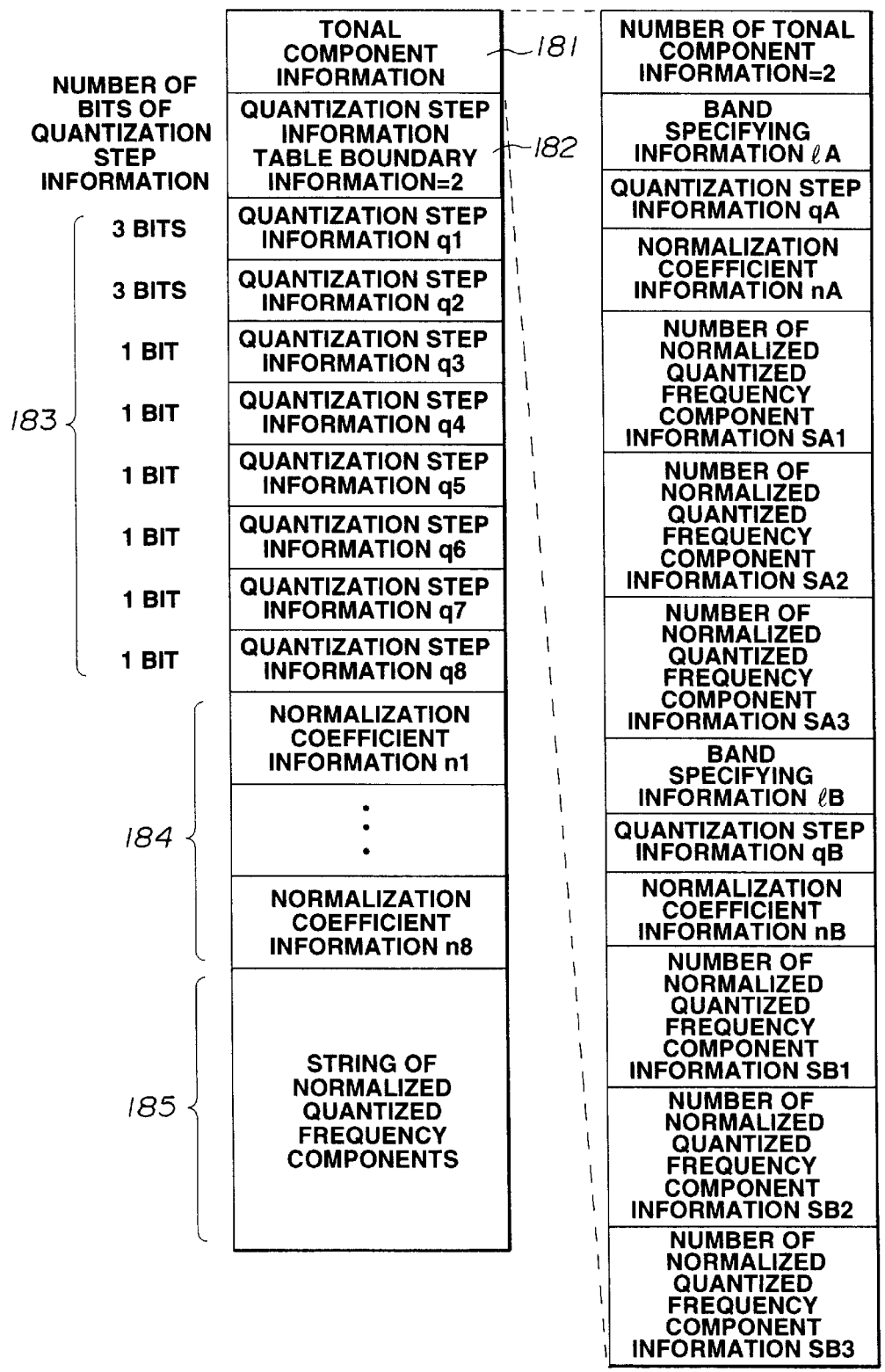
FIG. 18 illustrates an example of a codestring construction in case of separating tonal and noisy components in the second embodiment.

FIG. 18 shows a third example codestring generated by the second embodiment of the high efficiency encoding method, for a situation where the tonal components have been separated.

With the FIG. 18 codestring, the tonal component information 181 is similar to that of the FIG. 12 tonal component information 121. The tonal component information 181, obtained by encoding the separated tonal components, is arrayed first for each block. The tonal component information 181 is followed by the quantization precision information table boundary information 182 and the noisy component information 183 and 184, obtained by encoding the noisy components. Again, this is similar to the noisy component information 122 and 123 of FIG. 12. For the low frequency side, the noisy component information obtained by encoding the noisy components is quantized for each encoding block with the number of quantization steps that corresponds to the quantization step information code selected from the section of the quantization precision information table that corresponds to the quantization step information table selection codes "00" of Table 2. For the high range side, the noisy components are quantized with the number of quantization steps that corresponds to the quantization step information code selected from the section of the quantization precision information table that corresponds to the quantization step information table selection codes "10" of Table 2.

The above-described high efficiency encoding method of the second embodiment, if encoding is carried out by a method conforming to the ability of the encoder, efficient coding may be achieved in a manner suited to the respective cases. In effect, the encoding after separation of tonal components is favorable in realizing efficient encoding. However, with the present second embodiment, the amount of processing is larger than with encoding without preliminarily separating the tonal components. Thus, with an encoder with limited processing capability, it is difficult to effect the encoding after separating the tonal components over the entire range. It suffices in such case to set the number of bits of the quantization step information codes for each encoding block to a larger value up to a relatively higher frequency range or over the entire frequency range for assuring a broader latitude of selection of the number of quantization steps that can be selected for each encoding block.

On the other hand, if encoding is to be carried out using an encoder having a high processing capacity, it becomes possible to extract the tonal components from a broader range, for example, from the entire frequency range, and hence to decrease the number of quantization steps in a majority of encoding blocks in the high frequency range, thus enabling the number of bits of the quantization precision information codes representing the number of quantization steps to be set to a smaller value.

A high efficiency encoder in accordance with the second embodiment may be basically similar to the FIG. 11 encoding in accordance with the first embodiment. The method used to separate the tonal components may be the same as that shown in the FIG. 13 flow chart. Table 2 is stored in the noisy component encoding circuit 64 of FIG. 11. The quantization precision information table boundary information and the quantization step table selection codes are generated and provided by the quantization step decision circuit 33 within the noisy component encoding circuit 64 (FIG. 3).

The corresponding decoder is also basically the same as the FIG. 14 decoder. That is, the high efficiency decoder of the second embodiment first decodes the encoded quantization step information and the encoded normalization coefficient information. The decoder then processes the normalized and quantized frequency component information using the decoded quantization precision information and the normalization coefficient information. The noisy component decoding circuit 73 of the present second embodiment stores therein a table corresponding to Table 2 (quantization step information selection branches) and decodes the quantization step information codes by selecting the quantization step information associated with the quantization step information codes.

It is seen from the foregoing that, with the use of the high efficiency encoding method and apparatus of the second embodiment, the quantization precision (number of quantization steps) for a particular encoding block is chosen depending upon the frequency distribution of input signals and the capability of the processing device, thus enabling high efficiency encoding of input signals.

With the above-described first and second embodiments of the present invention, the signals encoded are those filtered by a band splitting filter before being orthogonal-transformed by MDCT in the transform circuits of FIGS. 1 and 11, and the signals being decoded are those inverse orthogonal-transformed by an inverse MDCT (IMDCT) circuit (i.e., band synthesized) before being filtered by a band-synthesizing filter. However, it is possible to carry out MDCT or IMDCT directly without employing the band-splitting filter or the band-synthesizing filter. It is also possible to employ DFT or DCT in place of MDCT described above.

Moreover, it is also possible to carry out the band splitting and band synthesis solely with a band-splitting filter and a band-synthesizing filter, respectively, without resorting to orthogonal transform. The encoding block may be a sole band, split using a band-splitting filter, or plural bands, obtained by grouping several bands together. The tonal components may be comprised of plural samples, within a sole band, or plural bands split using a band-splitting filter. However, it is preferred, for efficient application of the present invention, to use MDCT for orthogonal transform and to construct the encoding blocks after transforming the input signal into a large number of spectral components (spectra signals).

In the above description, encoding is carried out after separating the spectral components into tonal components and other components (noisy components). However, the present invention may be applied even if the separated and encoded components are not the tonal components in which the signal energy is concentrated in specified frequency ranges. However, the present invention may be applied most effectively by separating the tonal components, since it is the tonal components that must in need of quantization precision.

Although the foregoing description has been with reference to the encoding of acoustic signals, the present invention may also be applied to other signals, such as picture signals, which exhibit a sharp spectral distribution. Acoustic signals are most in need of high precision encoding since these signals generally have a sharp spectral distribution. The high-range side components of the acoustic signals do not require high quantization precision as compared to the low range side components, and the acoustically efficient encoding may be achieved by separating the tonal components before encoding.

The present method may also be applied to signals which are to be transmitted rather than being recorded on a recording medium.

It is seen from above that, with the encoding methods and apparatus of the present invention, it is possible to maintain a degree of freedom for controlling the quantization precision, while the number of bits representing the quantization step information can be maintained at a sufficiently low level, thus assuring high efficiency encoding. Moreover, with the encoding methods and apparatus of the present invention, it is possible to encode the quantization step information efficiently, with dependence upon the frequency distribution of the input signal or the capability of the encoder, thus realizing highly efficient encoding of input signals.

Thus it is possible with the high efficiency decoding method and apparatus of the present invention to produce optimum decoded signals, while effective utilizing the transmission capacity of a transmission or the recording capacity of a recording medium.

What is claimed is:

1. An encoding method for compression encoding of a digital signal, comprising the steps of:

transforming the digital signals into spectral components;

blocking said spectral components into encoding blocks each having at least two spectral components;

for at least one of said encoding blocks, separating said blocked spectral components into first spectral components made up of specified samples and second spectral components excluding said first spectral component;

normalizing and, with a quantization precision, quantizing at least said first spectral components, for at least one encoding block from which said first spectral components are derived;

encoding the normalized and quantized first spectral components;

determining a number of bits with which to encode information indicating the quantization precision; and encoding, in the determined number of bits, the information indicating the quantization precision.

2. The encoding method of claim 1, wherein the quantization precision with which first spectral components in higher frequency range encoding blocks are quantized is lower than the quantization precision with which first spectral components in a lower frequency range encoding blocks are quantized.

3. The encoding method of claim 1, wherein the information indicating the quantization precision indicates one of a plurality of quantization precision values to be selected for an encoding block.

4. The encoding method of claim 2, further comprising the step of:

generating boundary information indicating at least one boundary of quantization precision information.

5. The encoding method of claim 4, wherein said boundary information specifies a number of low frequency range encoding blocks to be quantized using a same quantization precision value.

6. The encoding method of claim 1, wherein said first spectral components are tonal components made up of a group of spectral components having an energy level higher than an average energy level of all the spectral components within the encoding block.

7. The encoding method of claim 1, wherein said second spectral components are tonal components made up of a group of spectral components having an energy level higher than an average energy level of all the spectral components within the encoding block.

8. An encoding apparatus for compression encoding of a digital signal, comprising:
   means for transforming the digital signals into spectral components;
   means for blocking said spectral components into encoding blocks each having at least two spectral components;
   means, for at least one of said encoding blocks, for separating said blocked spectral components into first spectral components made up of specified samples and second spectral components excluding said first spectral components;
   means for normalizing and quantizing at least said first spectral components, for at least one encoding block from which said first spectral components are derived, with a quantization precision;
   means for encoding the normalized and quantized first spectral components;
   means for determining a number of bits with which to encode information indicating the quantization precision; and
   means for encoding, in the determined number of bits, the information indicating the quantization precision.

9. The encoding apparatus of claim 8, wherein the quantization precision with which first spectral components in higher frequency range encoding blocks are quantized by said means for normalizing and quantizing is lower than the quantization precision with which first spectral components in a lower frequency range encoding blocks are quantized by said means for normalizing and quantizing.

10. The encoding apparatus of claim 8, wherein the information indicating the quantization precision indicates one of a plurality of quantization precision values to be selected for quantizing an encoding block.

11. The encoding apparatus of claim 9, further comprising:
    means for generating boundary information indicating at least one boundary of quantization precision information.

12. The encoding apparatus of claim 11, wherein said boundary information specifies a number of low frequency range encoding blocks to be quantized by said means for normalizing and quantizing using a same quantization precision value.

13. The encoding apparatus of claim 8, wherein said first spectral components are tonal components made up of a group of spectral components having an energy level higher than an average energy level of all the spectral components within the encoding block.

14. The encoding apparatus of claim 8, wherein said second spectral components are tonal components made up of a group of spectral components having an energy level higher than an average energy level of all the spectral components within the encoding block.

15. A decoding method for decoding encoded digital signals wherein encoded first spectral components and encoded second spectral components are derived from a same encoding block, the method comprising: decoding the encoded first spectral components;
decoding the encoded second spectral components; and
synthesizing the decoded first and second spectral components
wherein the encoded first spectral components are decoded based upon information indicating a quantization precision of the encoded first spectral components, the information indicating the quantization precision denoting one of a plurality of quantization precision values from one encoding block to another, and the information which indicates the quantization precision is specified with a particular number of bits depending on the encoding block,
wherein the step of decoding the first spectral components includes:
    decoding information indicating the particular number of bits in which the quantization precision for the encoding block is encoded;
    decoding the quantization precision for the encoding block responsive to the decoded information indicating the particular number of bits in which the quantization precision for the encoding block is encoded; and
    decoding the first spectral components of the responsive to the decoded quantization precision.

16. The decoding method of claim 15, wherein the information which indicates the quantization precision is specified with a smaller number of bits for high frequency range encoding block than for low frequency range encoding blocks.

17. The decoding method of claim 16, further comprising the step of:
    detecting boundary information which indicates a boundary of quantization precision values, and wherein the encoded second spectral components are decoded utilizing the detected boundary information.

18. The decoding method of claim 17, wherein said boundary information specifies a number of low frequency range blocks having a same quantization precision value.

19. The decoding method of claim 15, wherein said first spectral components are tonal components made up of a group of spectral components having an energy level higher than an average energy level of all the spectral components in the encoding block.

20. The decoding method of claim 15, further comprising the step of:
    selecting one of a plurality of quantization precision values based upon the information indicating the quantization precision.

21. A decoding apparatus for decoding encoded digital signals wherein encoded first spectral components and encoded second spectral components are derived from a same encoding block, the apparatus comprising:
    first decoding means for decoding the encoded first spectral components;
    second decoding means for decoding the encoded second spectral components; and
    means for synthesizing the decoded first and second spectral components
    wherein the encoded first spectral components are decoded by the first decoding means based upon information indicating a quantization precision of the encoded first spectral components, the information indicating the quantization precision denoting one of a plurality of quantization precision values from one encoding block to another, and the information which indicates the quantization precision is specified with a particular number of bits depending on the encoding block, wherein the first decoding means includes:
> means for decoding information indicating the particular number of bits in which the quantization precision for the encoding block is encoded;
> means for decoding the quantization precision for the encoding block responsive to the decoded information indicating the particular number of bits in which the quantization precision for the encoding block is encoded; and
> means for decoding the first spectral components of the responsive to the decoded quantization precision.

22. The decoding apparatus of claim 21, wherein the information which indicates the quantization precision is specified with a smaller number of bits for high frequency range encoding block than for low frequency range encoding blocks.

23. The decoding apparatus of claim 22, further comprising:
> means for detecting boundary information which indicates a boundary of quantization precision values, and wherein the second decoding means further comprises means for utilizing the detected boundary information.

24. The decoding apparatus of claim 23, wherein said boundary information specifies to the second decoding means a number of low frequency range blocks having a same quantization precision value.

25. The decoding apparatus of claim 21, wherein said first spectral components are tonal components made up of a group of spectral components having an energy level higher than an average energy level of all the spectral components in the encoding block.

26. The decoding apparatus of claim 21, further comprising:
> means for selecting one of a plurality of quantization precision values based upon the information indicating the quantization precision.

27. The encoding method of claim 1, wherein the determining step is responsive to a frequency of the encoding block having the first spectral components.

28. The encoding method of claim 27, wherein being responsive to the frequency of the encoding block having the first spectral components includes accounting for psychoacoustic characteristics of the human auditory system.

29. The encoding method of claim 1, and further comprising:
> encoding information indicating the determined number of bits.

30. The encoding apparatus of claim 8, wherein the determining means is responsive to a frequency of the encoding block having the first spectral components.

31. The encoding apparatus of claim 30, wherein being responsive to the frequency of the encoding block having the first spectral components includes accounting for psychoacoustic characteristics of the human auditory system.

32. The encoding apparatus of claim 8, and further comprising;
> means for encoding information indicating the determined number of bits.

* * * * *